(12) United States Patent
Koehler et al.

(10) Patent No.: US 11,194,620 B2
(45) Date of Patent: Dec. 7, 2021

(54) VIRTUAL MACHINE MIGRATION TASK MANAGEMENT

(71) Applicant: Nutanix, Inc., San Jose, CA (US)

(72) Inventors: Heiko Friedrich Koehler, San Jose, CA (US); Sameer Narkhede, Sunnyvale, CA (US); Venkatesh Kothakota, Fremont, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 16/176,653

(22) Filed: Oct. 31, 2018

(65) Prior Publication Data

US 2020/0133718 A1   Apr. 30, 2020

(51) Int. Cl.
    *G06F 9/48*     (2006.01)
    *G06F 9/50*     (2006.01)
    *G06F 9/455*     (2018.01)

(52) U.S. Cl.
CPC ........ *G06F 9/4856* (2013.01); *G06F 9/45558* (2013.01); *G06F 9/4881* (2013.01); *G06F 9/5077* (2013.01); *G06F 2009/4557* (2013.01)

(58) Field of Classification Search
CPC .... G06F 9/4856; G06F 9/4881; G06F 9/5077; G06F 9/45558; G06F 9/45533; G06F 2009/4557
See application file for complete search history.

(56) References Cited

U.S. PATENT DOCUMENTS

| | | | |
|---|---|---|---|
| 7,962,587 B2 | 6/2011 | Tripathi | |
| 8,397,236 B2 * | 3/2013 | Gibson | G06F 9/4881 718/100 |
| 8,549,518 B1 | 10/2013 | Aron et al. | |

(Continued)

FOREIGN PATENT DOCUMENTS

CN     107301088 A  * 10/2017

OTHER PUBLICATIONS

Bangjie et al., "Priority-Based Live Migration of Virtual Machine", Conference Paper, *DATICS-GPC 2013: Design, Analysis and Tools for Integrated Circuits and Systems*, (May 2013).

(Continued)

*Primary Examiner* — Lewis A Bullock, Jr.
*Assistant Examiner* — Kevin X Lu
(74) *Attorney, Agent, or Firm* — Vista IP Law Group, LLP

(57) ABSTRACT

Systems and methods for preferential treatment of a prioritized virtual machine during migration of a group of virtual machines from a first virtualized computing environment to a second virtualized computing environment. A data structure is allocated to store virtual machine migration task attributes that are associated with a plurality of in-process virtual machine migration tasks. As migration proceeds, the migration task attributes in the data structure are updated to reflect ongoing migration task scheduling adjustments and ongoing migration task resource allotments. A user interface or other process indicates a request to prioritize migration of a particular one of the to-be-migrated virtual machines. Based on the request, at least some of the virtual machine migration task attributes are modified to indicate a reduced scheduling priority of some of the to-be-migrated virtual machine migration tasks so as to preferentially deliver computing resources to the prioritized virtual machine migration tasks.

24 Claims, 11 Drawing Sheets

(56) References Cited

U.S. PATENT DOCUMENTS

| | | | |
|---|---|---|---|
| RE44,686 E | 12/2013 | Keshav et al. | |
| 8,601,473 B1 | 12/2013 | Aron et al. | |
| RE44,818 E | 3/2014 | Jnagal et al. | |
| 8,789,043 B2 | 7/2014 | Biran et al. | |
| 8,850,130 B1 | 9/2014 | Aron et al. | |
| 9,286,127 B2* | 3/2016 | Guan | G06F 9/4881 |
| 9,348,655 B1* | 5/2016 | Tsirkin | G06F 9/5016 |
| 9,600,331 B1 | 3/2017 | Birkestrand et al. | |
| 9,619,258 B2 | 4/2017 | Abali et al. | |
| 9,619,259 B2 | 4/2017 | Abali et al. | |
| 9,632,815 B2 | 4/2017 | Decusatis et al. | |
| 9,672,054 B1 | 6/2017 | Gupta et al. | |
| 9,760,392 B1 | 9/2017 | Dantkale et al. | |
| 9,772,866 B1 | 9/2017 | Aron et al. | |
| 9,942,323 B2 | 4/2018 | Vasetsky et al. | |
| 10,552,200 B2 | 2/2020 | Franciosi et al. | |
| 2008/0222375 A1 | 9/2008 | Kotsovinos et al. | |
| 2009/0007106 A1 | 1/2009 | Araujo, Jr. et al. | |
| 2010/0228913 A1 | 9/2010 | Czezatke et al. | |
| 2011/0066597 A1 | 3/2011 | Mashtizadeh et al. | |
| 2011/0197039 A1 | 8/2011 | Green et al. | |
| 2011/0264788 A1 | 10/2011 | Costa | |
| 2011/0320556 A1 | 12/2011 | Reuther | |
| 2012/0017031 A1 | 1/2012 | Mashtizadeh et al. | |
| 2012/0017114 A1 | 1/2012 | Timashev et al. | |
| 2012/0096458 A1 | 4/2012 | Huang et al. | |
| 2012/0185848 A1* | 7/2012 | Devarakonda | G06F 9/5077 718/1 |
| 2012/0221710 A1 | 8/2012 | Tsirkin et al. | |
| 2012/0254131 A1 | 10/2012 | Al Kiswany et al. | |
| 2013/0132057 A1 | 5/2013 | Deng et al. | |
| 2013/0185719 A1 | 7/2013 | Kar et al. | |
| 2014/0040343 A1 | 2/2014 | Nickolov et al. | |
| 2015/0052516 A1 | 2/2015 | French et al. | |
| 2015/0149999 A1 | 5/2015 | Ramanathan et al. | |
| 2015/0212844 A1 | 7/2015 | Tsirkin et al. | |
| 2015/0324217 A1* | 11/2015 | Shilmover | G06F 9/45558 718/1 |
| 2015/0381589 A1 | 12/2015 | Tarasuk-Levin et al. | |
| 2016/0011900 A1 | 1/2016 | Reddy et al. | |
| 2016/0077845 A1* | 3/2016 | Earl | G06F 9/5027 718/1 |
| 2016/0269313 A1 | 9/2016 | Brooker et al. | |
| 2017/0177399 A1* | 6/2017 | Abali | G06F 9/4856 |
| 2017/0192812 A1* | 7/2017 | Hong | G06F 9/4881 |
| 2017/0212784 A1 | 7/2017 | Johnsen et al. | |
| 2018/0046492 A1* | 2/2018 | Bernal | G06F 9/45558 |
| 2018/0129523 A1 | 5/2018 | Bryant et al. | |
| 2018/0203715 A1 | 7/2018 | Granado | |
| 2018/0357092 A1 | 12/2018 | Kaul | |
| 2019/0044832 A1* | 2/2019 | Deval | H04L 41/0816 |
| 2019/0065229 A1 | 2/2019 | Tsirkin et al. | |
| 2019/0109799 A1 | 4/2019 | Nipane et al. | |
| 2019/0188036 A1* | 6/2019 | Yamamoto | G06F 9/4881 |
| 2019/0265995 A1 | 8/2019 | Franciosi | |
| 2019/0286475 A1 | 9/2019 | Mani | |

OTHER PUBLICATIONS

Abdul-Rahman et al., "Live Migration-based Resource Managers for Virtualized Environments: A Survey", Cloud Computing 2010 : The First International Conference on Cloud Computing, GRIDs, and Virtualization, (Jan. 2010), from https://pdfs.semanticscholar.org/b8ee/7f8e2568880aac2ab42ee53d006f30fcc7c4.pdf.

Red Hat, "Red Hat Virtualization 4.0 Virtual Machine Management Guide", Last updated Feb. 7, 2018.

Cano, I. et al., "Curator: Self-Managing Storage for Enterprise Clusters", *14th USENIX Symposium on Networked Systems Design and Implementation, NSDI '17*, (Mar. 27, 2017).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Narander, Kumar, et al. "Token-based Predictive Scheduling of Tasks in Cloud Data-centers" May 2015, from www.isca.in, vol. 4(IVC-2015), p. 29-33.

VMWARE vCENTER Server, Datasheet, from http://www.vmware.com/products, p. 1-4.

VMWARE, "Migrate a Powered-On Virtual Machine with vMotion in the vSphere Client", fromhttps://pubs.vmware.com/vsphere-51/topic/com.vmware.vsphere.vcenterhost.doc.

Final Office Action dated Oct. 27, 2020 for related U.S. Appl. No. 16/177,142.

Non-Final Office Action dated May 20, 2020 for related U.S. Appl. No. 16/177,142.

Kulkarni, R. A. et al., "Fuzzy based task prioritization and VM Migration of Deadline Constrained tasks in Cloud Systems", Proceedings of the International Conference on Inventive Computing and Informatics (ICICI 2017), (Nov. 2017).

Red Hat, "6.13. Migrating Virtual Machines Between Hosts", Virtual Machine Management Guide, Red Hat Virtualization Documentation Team, (Aug. 13, 2016), date retrieved from google.

Biddle, J. et al., "8.11.6. Setting Migration Priority", Administration Guide, Red Hat Enterprise Virtualization 3.1, Edition 1, (Nov. 9, 2012), date retrieved from google.

"Understanding Virtual Machine Priority and Preemption Behavior", Working Hard in IT, blog, (Feb. 11, 2013).

Finn, A., "You Pause a Clustered Hyper—V Host and Low Priority VMs are Quick Migrated!", Aidan Finn, IT Pro, (Nov. 5, 2012).

Jiang, B. et al., "Priority-Based Live Migration of Virtual Machine", Conference paper, International Conference on Grid and Pervasive Computing, (May 2013).

Zhang, Z. et al., "A Scheduling Method for Multiple Virtual Machines Migration in Cloud", *10th International Conference on Network and Parallel Computing (NPC)*, (Sep. 2013).

Non-Final Office Action dated Feb. 22, 2021 for related U.S. Appl. No. 16/177,142.

Karamanolis, C et al., "Virtual SAN Architecture Deep Dive", VMware, (Nov. 9, 2014), date retrieve from google.

VMWARE, "Administering VMware Virtual SAN: Virtual SAN 6.1", VMware, (Dec. 31, 2015).

VMWARE, "VMware VMotion", Product Datasheet, VMware, (Jun. 13, 2006), date retrieve from google.

VMWARE, "Resource Management with VMware DRS", VMware, (Revision Nov. 22, 2006).

VMWARE, "Scenarios: VMware Validated Design 4.0", VMware Validated Design for IT Automating IT 4.0, VMware, (Dec. 15, 2016).

(56) References Cited

OTHER PUBLICATIONS

VMWARE, "Architecture and Design: VMware Validated Design 4.0", VMware Validated Design for Micro-Segmentation 4.0, VMware, (Dec. 15, 2016).
VMWARE, "Planning and Preparation: VMware Validated Design 4.0", VMware Validated Design for Micro-Segmentation 4.0, VMware, (Dec. 15, 2016).
VMWARE, "Backup and Restore: VMware Validated Design 4.0", VMware Validated Design for Software-Defined Data Center 4.0, VMware, (Dec. 15, 2016).
VMWARE, "Certificate Replacement: VMware Validated Design 4.0", VMware Validated Design for Software-Defined Data Center 4.0 VMware, (Dec. 15, 2016).
VMWARE, "Introducing VMware Validated Designs for Software-Defined Data Center: VMware Validated Design 4.0", VMware Validated Design for Software-Defined Data Center 4.0, VMware, (Dec. 15, 2016).
VMWARE, "Migration: VMware Validated Design 4.0", VMware Validated Design for Software-Defined Data Center 4.0, VMware, (Dec. 15, 2016).
VMWARE, "Monitoring and Alerting: VMware Validated Design 4.0", VMware Validated Design for Software-Defined Data Center 4.0, VMware, (Dec. 15, 2016).
VMWARE, "Operational Verification: VMware Validated Design 4.0", VMware Validated Design for Software-Defined Data Center 4.0, VMware, (Dec. 15, 2016).
VMWARE, "Deployment for Region A: VMware Validated Design 4.0", VMware Validated Design for Software-Defined Data Center 4.0, VMware, (Modified on Sep. 26, 2017).
VMWARE, "Deployment for Region B: VMware Validated Design 4.0", VMware Validated Design for Software-Defined Data Center 4.0, VMware, (Modified on Sep. 26, 2017).
VMWARE, "Architecture and Design: VMware Validated Design 4.0", VMware Validated Design for Remote Office Branch Office 4.0, VMware, (Dec. 15, 2016).
VMWARE, "Certificate Replacement: VMware Validated Design 4.0", VMware Validated Design for Remote Office Branch Office 4.0, VMware, (Dec. 15, 2016).
VMWARE, "Deployment: VMware Validated Design 4.0", VMware Validated Design for Remote Office Branch Office 4.0, VMware, (Modified on Sep. 26, 2017).
VMWARE, "Planning and Preparation: VMware Validated Design 4.0", VMware Validated Design for Remote Office Branch Office 4.0, VMware, (Dec. 15, 2016).
VMWARE, "Site Protection and Recovery: VMware Validated Design 4.0", VMware Validated Design for Software-Defined Data Center 4.0, VMware, (Dec. 15, 2016).
VMWARE, "Upgrade: VMware Validated Design 4.0", VMware Validated Design for Software-Defined Data Center 4.0, VMware, (Dec. 15, 2016).
VMWARE, "Introducing VMware Validated Design Use Cases: VMware Validated Design 4.0", VMware, (Dec. 15, 2016).
Rivera R et al., "Understanding Data Locality in VMware Virtual SAN", Technical Marketing Documentation, VMware, (Jul. 2014).
Notice of Allowance dated Jul. 23, 2021 for related U.S. Appl. No. 16/177,142.

* cited by examiner

VIRTUAL MACHINE MIGRATION TASK MANAGEMENT

RELATED APPLICATIONS

The present application is related to U.S. patent application Ser. No. 16/177,142 titled "ASYNCHRONOUS WORKLOAD MIGRATION CONTROL", filed on even date herewith, which is hereby incorporated by reference in its entirety.

FIELD

This disclosure relates to virtualized computing systems, and more particularly to techniques for virtual machine migration task management.

BACKGROUND

In modern virtualized computing settings, virtualized entities (e.g., virtual machines, virtual disks, executable containers, etc.) are often migrated from one virtualized computing environment to another virtualized computing environment. For example, a set of virtual machines (VMs) and their respective virtualized disks (vDisks) might be migrated from a source computing environment at a first location to a target computing environment at a second location.

Migration of a set of virtualized entities (VEs) involves many tasks that are carried out by and between the source computing environment and the target computing environment. These virtual machine migration tasks each have specific purposes and relationships to other tasks. For example, the migration of a VM from a source computing environment to a target computing environment might comprise a sequence of interrelated migration tasks that perform migration operations such as, transferring an initial "seed" set of vDisk data, transferring vDisk snapshots "data deltas", and transferring the contents of other virtualized entities (e.g., virtual NICs), all while the VM is running at the source computing environment. Additionally, migrating a VM involves transferring the VM configuration metadata, powering up the VM at the target computing environment, interacting with a user, and/or performing other migration operations. In situations where the vDisk data are large and/or where the set of VMs to be migrated is large, the time to execute such migration tasks can be many hours or even days. More particularly, the availability of and contention for networking resources to carry out migration tasks can significantly impact migration time, since many data movement tasks associated with the set of VMs share the same finite availability of network I/O (input/output or IO) bandwidth.

In consideration of such potentially long migration times and/or resource constraints and/or other migration aspects, an administrator might want to prioritize the migration of a particular subject VM and its associated vDisk data in the presence of other in-process VM migrations. For example, the "IT Department" might want to have their VMs ported to the target environment to set up features of the target environment that are not available in the source environment. In such cases, at least some of the many underlying migration tasks that are then-currently running and/or scheduled to run (e.g., VMs of the "Finance Department", VMs of the "Sales Department", etc.) would need to be actively managed such that migration tasks pertaining to the particular subject VM are prioritized to preempt at least some of the migration tasks pertaining to other VMs.

Unfortunately, there is no mechanism that facilitates re-ordering and/or re-prioritization and/or preemption of migration tasks during migration of a set of VMs. What is needed is an improved way to achieve accelerated VM migration in the presence of the many in-process VM migrations that are contending for a finite amount of computing resources.

SUMMARY

The present disclosure describes techniques used in systems, methods, and in computer program products for migration task management, which techniques advance the relevant technologies to address technological issues with legacy approaches. More specifically, the present disclosure describes techniques used in systems, methods, and in computer program products for fine-grained management of in-process migration tasks. Certain embodiments are directed to technological solutions pertaining to the organization of data in data structures that facilitate fine-grained priority management of in-process migration tasks associated with migration of virtualized entities.

The disclosed embodiments modify and improve over legacy approaches. In particular, the herein-disclosed techniques provide technical solutions that address the technical problems attendant to achieving accelerated VM migration in the presence of the many in-process VM migrations that are contending for a finite amount of computing resources such as CPU resources (e.g., processor cycles and/or processing threads), networking resources (e.g., communication bandwidth), and storage resources (e.g., I/O performance capability and storage capacity).

Some embodiments disclosed herein use techniques to improve the functioning of multiple systems within the disclosed environments, and some embodiments advance peripheral technical fields as well. As specific examples, use of the disclosed computer equipment, networking equipment, and constituent devices within the shown environments as described herein and as depicted in the figures provide advances in the technical field of virtualized computing platform management as well as advances in various technical fields related to heterogeneous virtualized computing cluster configuration.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
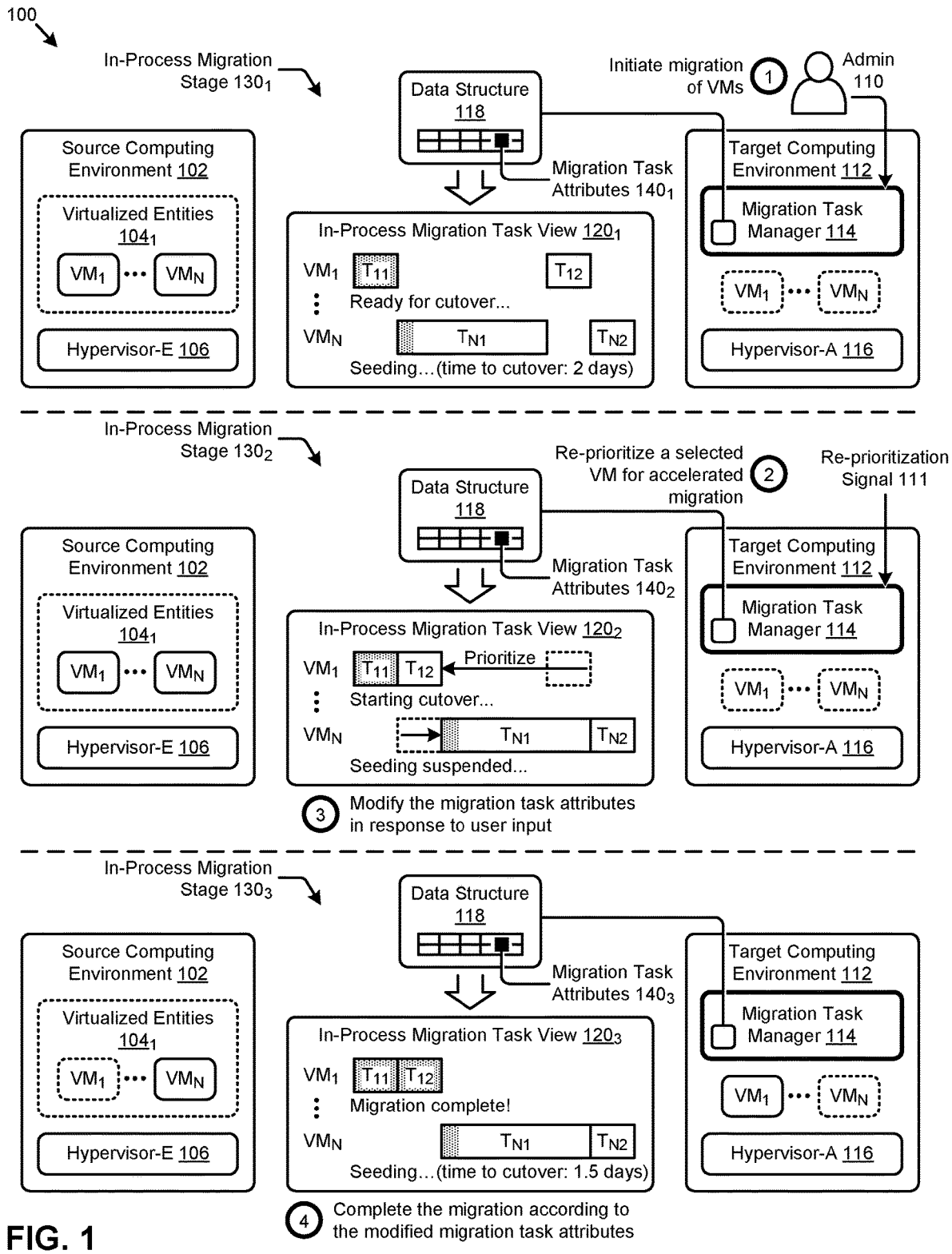
FIG. 1 illustrates a computing environment in which embodiments of the present disclosure can be implemented.

Embodiments in accordance with the present disclosure address the problem of achieving accelerated VM migration in the presence of the many in-process VM migrations that are contending for a finite amount of computing resources. Some embodiments are directed to approaches for implementing a data structure to facilitate fine-grained priority management of in-process migration tasks associated with migration of virtualized entities. The accompanying figures and discussions herein present example environments, systems, methods, and computer program products for fine-grained management of in-process migration tasks.

Overview

Disclosed herein are techniques that implements a migration task management scheme to facilitate fine-grained management of long-running, in-process migration tasks associated with migration of virtualized entities. In exemplary embodiments, a specialized data structure to store certain attributes associated with various migration tasks is implemented. As an example, the data structure facilitates recording of migration task identifiers, task relationships, task priorities, task status indicators, and/or other migration task attributes such that the tasks can be efficiently re-prioritized. The migration tasks correspond to one or more virtualized entities (VEs) that are selected to be migrated from a source computing environment to a target computing environment. When execution of migration tasks to migrate the VEs to the target computing environment has commenced, migration task attributes of in-process migration tasks are recorded in the data structure.

The initial execution order of migration tasks might be based on certain information that is available prior to invoking execution, such as then-current resource availability, then-current attributes of the virtualized entities, and/or then-current user prioritization specifications. During the execution of migration tasks, migration task attributes stored in the data structure undergo various changes. For example, a certain migration task might transition through various virtual machine migration states (e.g., from a "queued" state to a "running" state to a "done" state, etc.), which migration states and transitions may be represented by respective values or strings stored in the data structure.

In response to receiving one or more re-prioritization inputs while migration task execution is in-process, one or more of the migration task attributes are modified and stored in the data structure. The execution of migration tasks will continue in accordance with any modified migration attributes stored in the data structure. In particular, upon receipt of a re-prioritization signal to prioritize completion of migration of a first VM, the system will raise task priorities for the first VM (e.g., so as to accelerate migration of the first VM) and will adjust (e.g., reduce or lower) task priorities for the second VM (e.g., so as to suspend migration tasks of the second VM) such that migration tasks associated with the first VM are executed preferentially ahead of migration tasks associated with the second VM. In certain embodiments, groups of migration tasks associated with any and/or all of the to-be-migrated VMs other than the prioritized VM may be preempted by migration tasks associated with the re-prioritized VM such that progression of the migration tasks associated with the re-prioritized VM proceeds without contention for resources from other migration tasks.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates one aspect pertaining to implementing fine-grained priority management of in-process migration tasks associated with migration of virtualized entities. Specifically, the figure presents a logical depiction of how the herein disclosed techniques can be implemented in a computing environment to perform fine-grained control of in-process migration tasks.

The depiction of FIG. 1 illustrates a source computing environment 102 that hosts one or more virtualized entities of one or more workloads. The virtualized entities are entities that emulate various underlying shared computing resources (e.g., of a physical computing node) to facilitate usage as autonomous computing components. For example, such virtualized entities might include virtual machines (VMs), virtual disks (vDisks), virtual network interface cards (vNICs), executable containers (ECs), availability zones (AZs), and/or other entities. The operation of some of the virtualized entities (e.g., VMs) is facilitated by a hypervisor. As indicated in FIG. 1, for example, a set of virtualized entities $104_1$ comprising $VM_1$ through $VM_N$ interact with a hypervisor-E 106 to operate at source computing environment 102. In some cases, certain collections of virtualized entities are hierarchically associated. For example, a particular VM might be associated with a vNIC and one or more vDisks. Virtualized entities might also be associated by the workload or workloads they facilitate. For example, a first set of VMs and associated vDisks might be instantiated to run a virtual desktop infrastructure (VDI) workload for a certain department (e.g., finance, accounting, engineering, etc.) of an enterprise, and a second set of VMs and associated vDisks might be instantiated to run an SQL server workload.

As earlier mentioned, a need might arise to move (e.g., migrate) a set of virtualized entities from the source computing environment 102 to another computing environment, such as a target computing environment 112 shown in FIG. 1. As a representative example, virtualized entities $104_1$ might be selected by an admin 110 to migrate from source computing environment 102 to target computing environment 112. To perform the migration, many underlying migration tasks are executed. Such migration tasks each have a specific purpose and task relationships with other tasks. For example, migration of $VM_1$ from source computing environment 102 to target computing environment 112 might comprise a sequence of interrelated migration tasks that perform long-running migration operations such as, transferring an initial "seed" set of vDisk data, transferring vDisk snapshot data and transferring other data while $VM_1$ is still running at source computing environment 102.

This "seed" set of data is often an entire vDisk that is moved from the source computing environment to the target computing environment. For example, a single vDisk might correspond to a very large database, possibly terabytes in size. As such it can happen that transferring the entire vDisk of the seed set can consume nearly all of the elapsed time and nearly all of the computing resources involved in the migration.

When all or nearly all of the data of the seed set and snapshots have been transferred to the target environment, additional migration tasks transfer configuration metadata of $VM_1$ and manage tasks related to powering up an instance of $VM_1$ at target computing environment 112. When such migration tasks are running and/or scheduled to run, they are considered in-process migration tasks. In some cases, the set of tasks scheduled to run might require many hours or days to complete. To address certain issues that arise from potentially long migration times and/or to address issues that arise due to resource constraints, task-by-task contention, and/or other migration aspects, an admin 110 might want to prioritize migration of a particular subject VM (e.g., $VM_1$) and its associated vDisk data in the presence of other in-process VM migrations (e.g., migration of $VM_N$ and/or other VMs included in virtualized entities $104_1$). In such cases, at least some of the many underlying in-process migration tasks that are then currently running and/or scheduled to run would need to be actively managed such that in-process migration tasks pertaining to the particular subject VM are prioritized to preempt at least some of the in-process migration tasks pertaining to other VMs.

The herein disclosed techniques provide a mechanism that facilitates such re-ordering and/or re-prioritization and/or preemption of in-process migration tasks during migration of a set of virtualized entities. In the embodiment of FIG. 1, the foregoing mechanism comprises a data structure 118 and a migration task management scheme that are implemented at a migration task manager 114 at target computing environment 112 to facilitate fine-grained management of in-process migration tasks associated with migration of virtualized entities. As used herein, a data structure is a format for organizing data for storage, access, modification and/or other operations.

Specifically, data structure 118 and/or other data structures described herein improve the way a computer stores and retrieves data in memory when performing steps pertaining to fine-grained management of in-process migration tasks. More specifically, data structure 118 is implemented to organize and/or store instances of migration task attributes. Such migration task attributes comprise attributes (e.g., task identifier, task type, status, etc.) associated with in-process migration tasks that are executed to carry out migrations of virtualized entities. As an example, data structure 118 might organize and/or store a set of migration task attributes in a tabular structure that has rows that relate various attributes with a particular in-process migration task. As another example, migration task attributes might be organized and/or stored in a programming code object that has instances corresponding to a particular in-process migration task, its state, and its properties or attributes. Ongoing modification of state changes are supported by high-performance hashing techniques and/or other techniques that achieve constant time (e.g., O(1)) data storage and retrieval. Such techniques may be employed in such a way that a large number of migration tasks can be re-prioritized or otherwise modified in a single re-prioritization cycle without having to perform searches through the data structure.

A particular application of the herein disclosed techniques as facilitated by data structure 118 and migration task manager 114 is illustrated in the three in-process migration stages (e.g., in-process migration stage $130_1$, in-process migration stage $130_2$, and in-process migration stage $130_2$) of FIG. 1. As shown in in-process migration stage $130_1$, the completion progress of the in-process migration tasks for $VM_1$ through $VM_N$ at some moment in time is illustrated in an in-process migration task view $120_1$. The order of execution of the tasks shown in in-process migration task view $120_1$ might correspond to an initial task schedule determined in response to admin 110 initiating a migration of virtualized entities $104_1$ from source computing environment 102 to target computing environment 112 (operation 1). In the shown representative example, two migration tasks for each VM are to be executed to complete migration of the VM. The first migration task for each VM (e.g., task $T_{11}$ and task $T_{N1}$) corresponds to transfer of the seed data associated with the VM, and the second migration task for each VM (e.g., task $T_{12}$ and task $T_{N2}$) corresponds to the cutover of the VM to the target computing environment.

As illustrated in in-process migration task view $120_1$, $VM_1$ might have completed the transfer of its seed data (e.g., task $T_{11}$) and is "ready for cutover", while $VM_N$ remains in the "seeding" process (e.g., task $T_{N1}$). A set of migration task attributes $140_1$ recorded at data structure 118 and managed by migration task manager 114 will correspond to the foregoing progress information by, for example, indicating that task $T_{11}$ associated with $VM_1$ has completed, and that task $T_{N1}$ associated with $VM_N$ is currently running. The information presented in in-process migration task view $120_1$ further indicates that the expected time to complete task $T_{N1}$ for $VM_N$ is "2 days". At this stage, $VM_1$ and $VM_N$ are contending for computing and networking resources to complete their respective migrations (e.g., complete task $T_{12}$ for $VM_1$, and tasks $T_{N1}$ and $T_{N2}$ for $VM_2$), which can result in a long latency (e.g., up to 2 days) incurred to complete the cutover of $VM_1$. Furthermore, $VM_1$ is being migrated from hypervisor-E 106 to a hypervisor-A 116 at target computing environment 112. In this case, $VM_1$ might be unavailable (e.g., powered down) for a time commensurate with the foregoing cutover latency.

As shown by the in-process migration stage $130_2$, admin 110 (e.g., using a user interface) can remediate such potentially long cutover latencies by providing a re-prioritization signal 111 to migration task manager 114 so as to asynchronously prioritize (e.g., accelerate) the $VM_1$ migration (operation 2). The migration task manager 114 responds to a re-prioritization input (e.g., from the admin user interface, or from any other computing process) by modifying one or more of migration task attributes corresponding to the in-process migration tasks of $VM_1$, $VM_N$, and/or other virtualized entities associated with the subject migration (operation 3). Specifically, the priority level, processing order, and/or other attributes of VMs might be modified to prioritize the migration of $VM_1$. The modified migration task attributes are then stored as a modified set of migration task attributes $140_2$ in data structure 118. As illustrated in in-process migration task view $120_2$, the modified set of migration task attributes $140_2$ prioritizes task $T_{12}$ associated with $VM_1$ over task $T_{N1}$ associated with $VM_N$, even when task $T_{N1}$ is in-process. In this case, seeding (e.g., task $T_{N1}$) of $VM_N$ is suspended and cutover of $VM_1$ is instead started.

As can be observed in in-process migration stage $130_3$, migration task manager 114 then completes migration of virtualized entities $104_1$ in accordance with the foregoing modifications (operation 4), and/or any other modifications, to instances of migration task attributes (e.g., migration task attributes $140_3$) stored in data structure 118. Specifically, and as shown in in-process migration task view $120_3$, when the cutover (e.g., task $T_{12}$) of $VM_1$ is completed, the seeding (e.g., task $T_{N1}$) of $VM_N$ is resumed.

The aforementioned fine-grained in-process migration task control capabilities facilitated by the herein disclosed techniques result in improvements in computer functionality that serve to reduce demands for computer processing power, reduce demands for computer memory and data storage, reduce network bandwidth use, and reduce demands for inter-component communication in computing environments. Specifically, applications of the herein disclosed techniques reduce consumption of computing resources by minimizing or eliminating computing resources consumed by certain migration processes that are cancelled and/or restarted in response to information (e.g., latency estimates, user intervention, etc.) obtained after initiation of migration processes.

One embodiment of techniques for such fine-grained migration task management is disclosed in further detail as follows.

Figure 2:
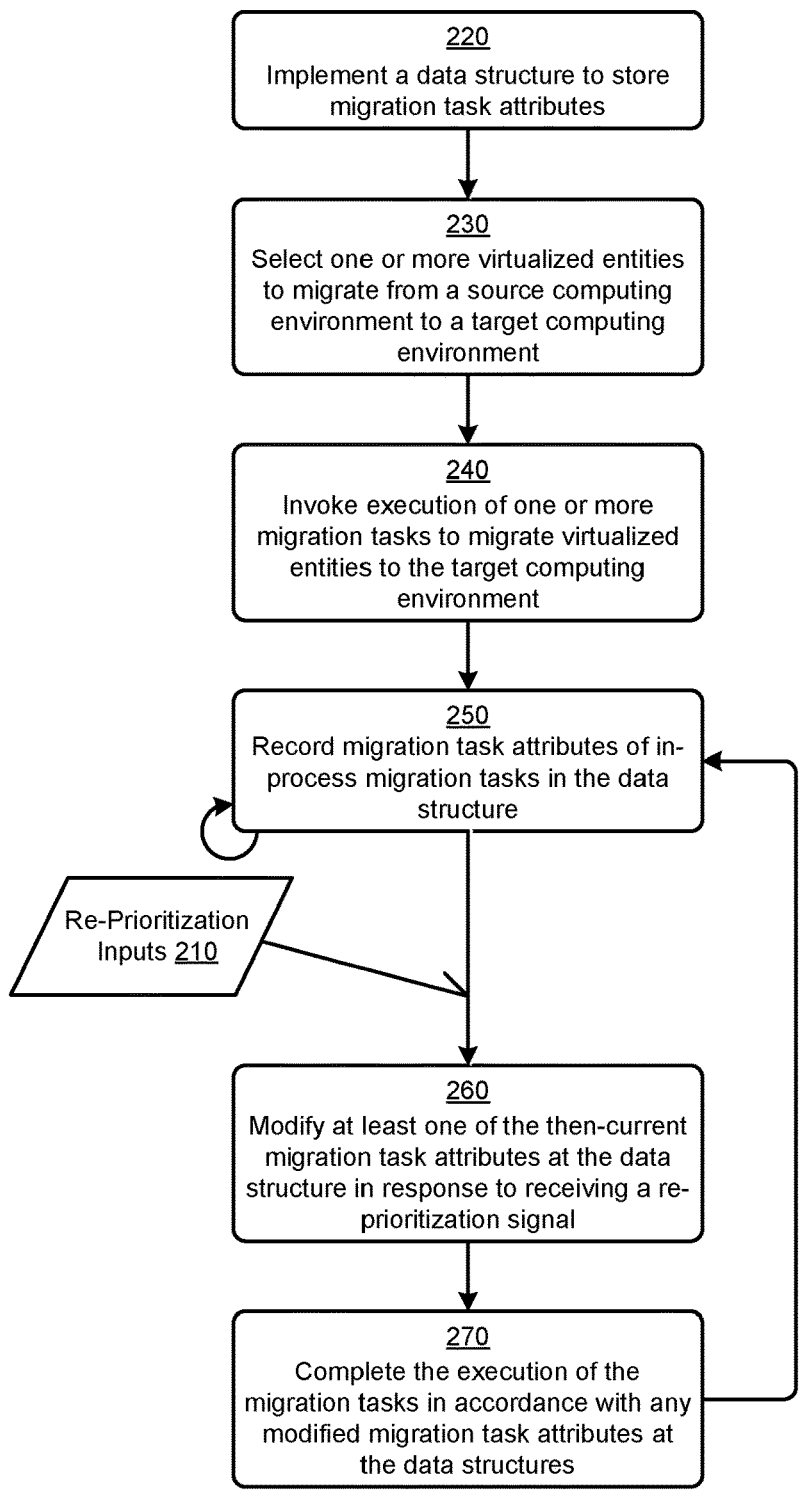
FIG. 2 depicts a migration task management technique as implemented in systems that facilitate fine-grained management of in-process migration tasks, according to an embodiment.

FIG. 2 depicts a migration task management technique 200 as implemented in systems that facilitate fine-grained management of in-process migration tasks. As an option, one or more variations of migration task management technique 200 or any aspect thereof may be implemented in the context of the architecture and functionality of the embodiments described herein. The migration task management technique 200 or any aspect thereof may be implemented in any environment.

FIG. 2 illustrates one aspect pertaining to fine-grained priority management of in-process migration tasks associated with migration of virtualized entities. Specifically, the figure is presented to illustrate one embodiment of certain steps and/or operations that facilitate fine-grained management of in-process migration tasks by manipulating migration task attributes associated with corresponding in-process migration tasks.

The migration task management technique 200 can commence by implementing a specialized data structure to store migration task attributes (step 220). Such migration task attributes might correspond to a set of migration tasks that are executed to migrate certain virtualized entities over various computing environments. Specifically, one or more such virtualized entities are selected to migrate from a source computing environment to a target computing environment (step 230). The two environments might be distinguished by various aspects pertaining to each environment, such as a service provider, a service model, a hypervisor type, a hardware deployment model (e.g., on-premises, cloud-based, etc.), and/or other aspects of an environment. Execution of one or more migration tasks is invoked to migrate virtualized entities to the target computing environment (step 240). When migration tasks are being executed or scheduled for execution, they are considered in-process migration tasks. Migration task attributes of such in-process migration tasks are recorded in the data structure (step 250). As indicated in FIG. 2, recording migration task attributes is an ongoing process.

In response to receiving one or more re-prioritization signals, at least one of the then-current migration task attributes at the data structure is modified (step 260). For example, one or more instances of re-prioritization inputs 210 might invoke a modification of one or more of the migration task attributes (e.g., a priority level) associated with one or more of the in-process migration tasks. The re-prioritization inputs 210 might be user inputs received at a graphical user interface (e.g., by clicking a button, selecting a dropdown item, etc.), or at a command line interface (e.g., by entering a call to a script, etc.), or at another mechanism for receiving input from a user (e.g., an administrator). Alternatively, or additionally, the re-prioritization inputs 210 might be signals raised by a migration process.

The execution of in-process migration tasks associated with the virtualized entities is then completed in accordance with any modified migration task attributes and/or any other migration task attributes recorded in the data structure (step 270). As can be observed, as execution of the in-process migration tasks is carried out in accordance with migration task attributes, migration task attributes in the data structure are continually being updated (step 250).

One embodiment of a system, data flows, and data structures for implementing the migration task management technique 200 and/or other herein disclosed techniques is disclosed as follows.

Figure 3:
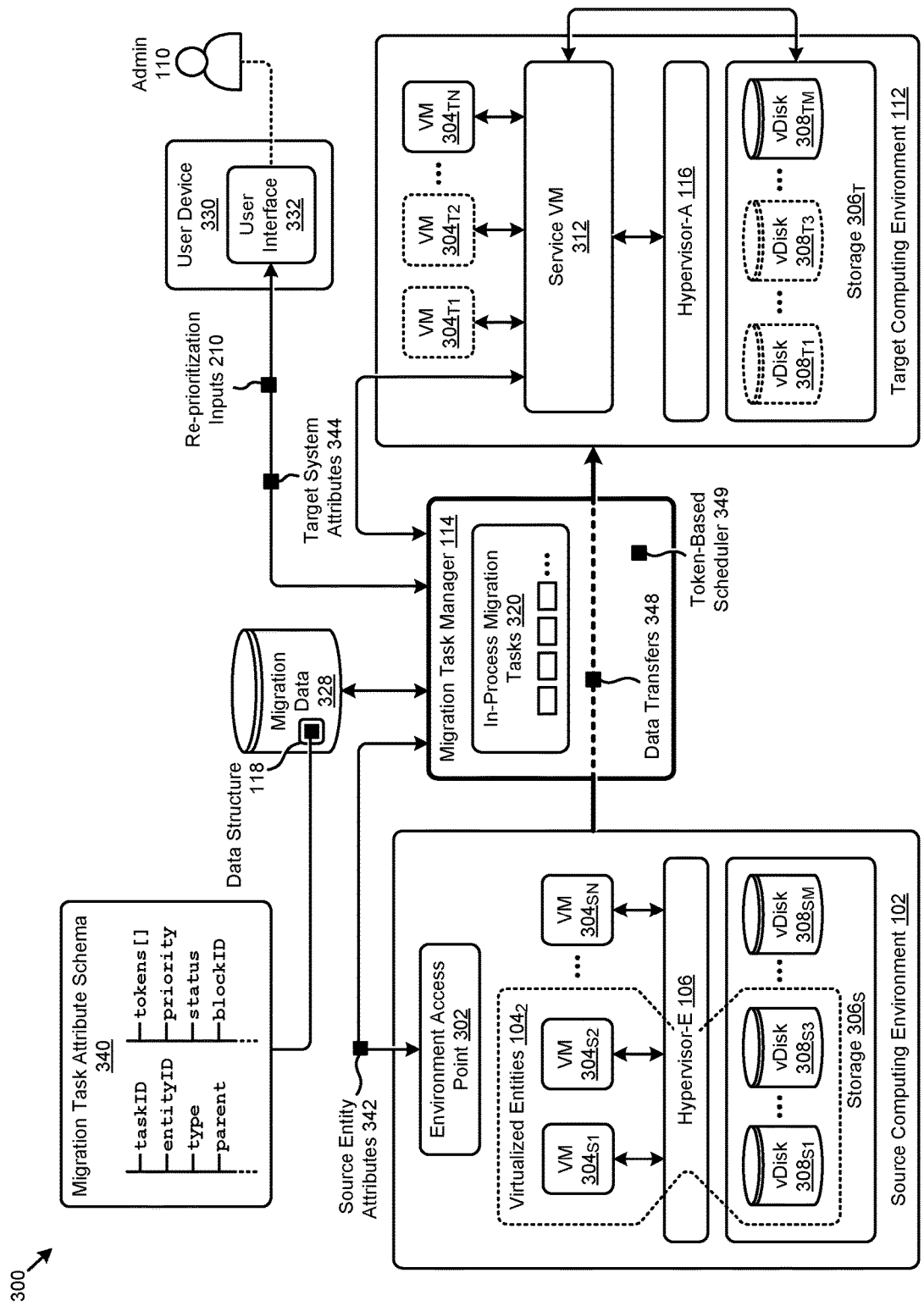
FIG. 3 is a block diagram of a system that implements fine-grained management of in-process migration tasks, according to an embodiment.

FIG. 3 is a block diagram of a system 300 that implements fine-grained management of in-process migration tasks. As an option, one or more variations of system 300 or any aspect thereof may be implemented in the context of the architecture and functionality of the embodiments described herein. The system 300 or any aspect thereof may be implemented in any environment.

FIG. 3 illustrates one aspect pertaining to implementing fine-grained priority management of in-process migration tasks associated with migration of virtualized entities. Specifically, the figure is being presented to show one embodiment of certain representative components and associated data flows that describes how the herein disclosed techniques might be implemented in modern computing environments (e.g., virtualization computing environments). Components and data flows shown in FIG. 3 present one partitioning and associated data manipulation approach. The specific example shown is purely exemplary, and other subsystems, data structures, and/or partitioning are reasonable.

As shown in FIG. 3, the system 300 comprises the source computing environment 102 and the target computing environment 112 earlier described. Each computing environment might comprise one or more nodes that have multiple tiers of storage in a storage area (e.g., storage $306_S$ and storage $306_T$). Each node can be associated with one server or appliance, multiple servers or appliances, or portions of a server or appliance. Nodes can be associated (e.g., logically and/or physically) with one or more computing clusters. Multiple tiers of storage can include instances of local storage. For example, local storage can be within or directly attached to a server and/or appliance associated with the nodes. Such local storage can include solid state drives (SSDs), hard disk drives (HDDs), and/or other storage devices. In some embodiments, multiple tiers of storage can include storage that is accessible through a network (e.g., a private network and/or a public network), such as a storage area network (SAN), network attached storage (NAS), etc.).

As shown, any of the nodes of source computing environment 102 or target computing environment 112 can implement one or more virtualized entities, such as virtual machines (e.g., VM $304_{S1}$, VM $304_{S2}$, ..., VM $304_{SN}$; VM $304_{T1}$, VM $304_{T2}$, ..., VM $304_{TN}$, and service VM 312), virtual disks (e.g., vDisk $308_{S1}$, ..., vDisk $308_{S3}$, ..., vDisk $308_{SM}$; vDisk $308_{T1}$, ..., vDisk $308_{T3}$, ..., vDisk $308_{TM}$), and/or executable containers. VMs can be characterized as software-based computing "machines" implemented in a hypervisor-assisted virtualization environment that emulates underlying computing resources (e.g., CPU, memory, etc.) of the nodes. For example, multiple VMs can operate on one physical machine (e.g., node host computer) running a single host operating system, while VMs run multiple applications on various respective guest operating systems. Such flexibility can be facilitated at least in part by one of a variety of heterogeneous hypervisors (e.g., hypervisor-E 106, hypervisor-A 116, etc.), which hypervisors are logically located between various guest operating systems of the VMs and host operating system of the physical infrastructure.

As an alternative, executable containers may be implemented at the nodes in an operating system-based virtualization environment or container virtualization environment. Executable containers can be implemented at the nodes either in an operating system virtualization environment or in a container virtualization environment. The executable containers comprise groups of processes and/or computing resources (e.g., memory, CPU, disk, etc.) that are isolated from the node host computer and other containers. Such executable containers directly interface with the kernel of the host operating system without, in most cases, a hypervisor layer. This lightweight implementation can facilitate efficient distribution of certain software components, such as applications or services (e.g., micro-services). Any node of system 300 can implement both a hypervisor-assisted virtualization environment and a container virtualization environment.

Furthermore, any node in source computing environment 102 or target computing environment 112 can implement one or more virtualized controllers to facilitate, at least in part, access to storage facilities (e.g., storage pools, networked storage, etc.) by VMs and/or executable containers operating at nodes within the environments. As used in these embodiments, a virtualized controller is a collection of software instructions that serve to abstract details of underlying hardware or software components from one or more higher-level processing entities. A virtualized controller can be implemented as a virtual machine, as an executable container (e.g., a Docker container), or within a layer (e.g., such as a layer in a hypervisor). As can be observed in system 300, an instance of a virtual machine (e.g., service VM 312) at target computing environment 112 is used as a virtualized controller to, at least in part, manage storage and I/O operations (e.g., to and from storage $306_T$). A virtualized controller or virtualized server might be implemented at source computing environment 102 to, at least in part, serve as an environment access point 302. Such an access point will often manage information (e.g., metadata) about and access to virtualized entities in the environment.

Varying architectures and/or configurations of virtualized entities at source computing environment 102 and target computing environment 112 are facilitated by respective variations in the hypervisor type implemented in each environment. For example, hypervisor-E 106 implemented at source computing environment 102 might correspond to software from a first hypervisor vendor, and hypervisor-A 116 implemented at target computing environment 112 might correspond to a second hypervisor vendor.

As can be observed, to facilitate fine-grained management of in-process migration tasks executed to migrate virtualized entities from source computing environment 102 to target computing environment 112, an instance of migration task manager 114 is implemented in the target computing environment (e.g., in service VM 312). In other embodiments a portion of migration task manager 114 might execute in the source computing environment, while another portion of migration task manager 114 executes in the target computing environment. A user (e.g., admin 110) can interact with migration task manager 114 through a user interface 332 presented at a user device 330. Specifically, admin 110 can access such a user interface to invoke a migration process that migrates a plurality of virtualized entities $104_2$ from source computing environment 102 to target computing environment 112. As represented graphically in FIG. 3, the outcome of the migration process is a migration of the VMs (e.g., VM $304_{S1}$ and VM $304_{S2}$) and corresponding vDisks (e.g., vDisk $308_{S1}$, ..., vDisk $308_{S3}$) comprising virtualized entities $104_2$ to instances of VMs (e.g., VM $304_{T1}$ and VM $304_{T2}$) and corresponding vDisks (e.g., vDisk $308_{T1}$, . . . , vDisk $308_{T3}$) at target computing environment 112.

To facilitate the foregoing migration process associated with virtualized entities $104_2$, migration task manager 114 accesses environment access point 302 at source computing environment 102 to collect instances of source entity attributes 342 pertaining to the migration process. For example, source entity attributes 342 might describe characteristics of virtualized entities that are selected for migration. Such source entity attributes might be stored in a set of migration data 328 for access by migration task manager 114. Certain instances of target system attributes 344 might also be stored in migration data 328. Target system attributes 344 might specify information (e.g., user credentials, IP addresses, etc.) to facilitate data transfers to target computing environment 112. As shown, for example, instances of target system attributes 344 might be provided by admin 110 at user interface 332 for provisioning access to service VM 312 at target computing environment 112 by migration task manager 114.

The service VM 312 may be configured to perform a wide range of tasks. Strictly as an illustrative example, a service VM can handle storage I/O (e.g., perform or route storage I/O requests to hypervisors and/or perform or route storage I/O requests to storage devices of a storage area). As another illustrative example, a service VM can handle certain migration tasks that are performed in conjunction with a hypervisor. As one specific example, a service VM can handle configuration and initialization of a hypervisor prior to power up of any VM that runs on top of a corresponding hypervisor. More particularly, various embodiments of a service VM can be configured as a storage controller that is used to manage all storage and I/O activities to and from all of the storage areas within the computing environment. In some computing environments multiple storage controllers coordinate among multiple nodes of a computing cluster.

The service VMs are not formed as part of specific implementations of hypervisors; instead, the service VMs run as virtual machines above hypervisors, and the service VMs work together to form a distributed computing system that manages all storage resources, including any locally attached storage, any networked storage, and any cloud storage. Since the service VMs run above the hypervisors, this means that the current workload migration approach can be used and implemented within and/or between any virtual machine architecture using any hypervisor from any hypervisor vendor.

To carry out the migration process, migration task manager 114 manages a set of in-process migration tasks 320 that, at least in part, receive data from source computing environment 102. The received data can comprise metadata and/or the underlying data (e.g., vDisk data) associated with the virtualized entities being migrated. Migration task manager 114 might employ a token-based scheduler 349 as well as certain data management techniques (e.g., change block tracking) to track the data that is received. The received data is transmitted in a set of data transfers 348 to target computing environment 112 to complete the migration.

In-process migration tasks 320 associated with virtualized entities $104_2$ are managed according to the herein disclosed techniques. Specifically, and as shown, data structure 118 is implemented in migration data 328 to record and track various instances of migration task attributes associated with in-process migration tasks 320 throughout the migration process. As indicated in a migration task attribute schema 340, the migration task attributes recorded in data structure 118 (e.g., as a table row or programming object instance) might describe for each in-process migration task, a task identifier (e.g., stored in a "taskID" field), an entity identifier of the virtualized entity or entities associated with the task (e.g., stored in an "entityID" field), a task type description (e.g., stored in a "type" field), one or more task relationships (e.g., a parent or prerequisite task identified in a "parent" field), processing token counts (e.g., stored in resource-specific entries in a "tokens[ ]" array), a task priority description (e.g., stored in a "priority" field), a task status description (e.g., stored in a "status" field), a data block identifier (e.g., stored in a "blockID" field), and/or other attributes of the in-process migration task.

The aforementioned processing token counts might be associated with particular types of tokens that are in turn associated with particular types and/or availability of computing resources (e.g., CPU resource tokens, networking resource tokens, storage resource tokens, etc.). Any combination of different types of processing tokens can be allocated to a respective in-process migration task. Moreover, the number of processing tokens delivered to a particular task can vary based on a resource demand profile of that particular task at a particular time.

Still further, a token-based scheduler 349 manages the number of processing tokens allocated to a particular task based on availability of computing resources. Specifically, the number of tokens allocated to a task can vary based on availability of tokens in corresponding resource pools and/or based on the quantities and types of resource demands from other tasks (e.g., based on actual measured demands or based on predicted demands). As such, the token-based scheduler observes a fine-grained heterogeneous resource access regime such that heterogeneous processing tokens may be delivered to certain prioritized tasks so as to ensure preferential scheduling and execution of one particular task (e.g., a prioritized task) over other tasks. In certain scheduling approaches, processing tokens are allocated to tasks based on fine-grained predicted demands by a particular task, which fine-grained predicted demands are bounded by an amount of demand to be expended in a single upcoming scheduling interval.

Allocating a processing token to a particular task indicates that computing resources are available to the task. In some scheduling regimes, allocation of an apportioned quantity of processing tokens can serve as a mechanism for applying task priority levels. For example, a token-based scheduler can allocate available processing tokens to in-process migration tasks in accordance with their relative priority assignments such that the tasks with the highest priorities will be executed ahead of tasks with lower priorities. The aforementioned data block identifier might be included in instances of migration task attributes to identify the most recent data block transferred by a particular in-process migration task. The data block identifier can then be used, for example, to enable an earlier-suspended in-process migration task to continue a data transfer process at the point in the process where it had been before being suspended.

The foregoing discussions include techniques for invoking migration tasks to migrate a set of virtualized entities from a source computing environment to a target computing environment (e.g., step 240 of FIG. 2), which techniques are disclosed in further detail as follows.

Figure 4:
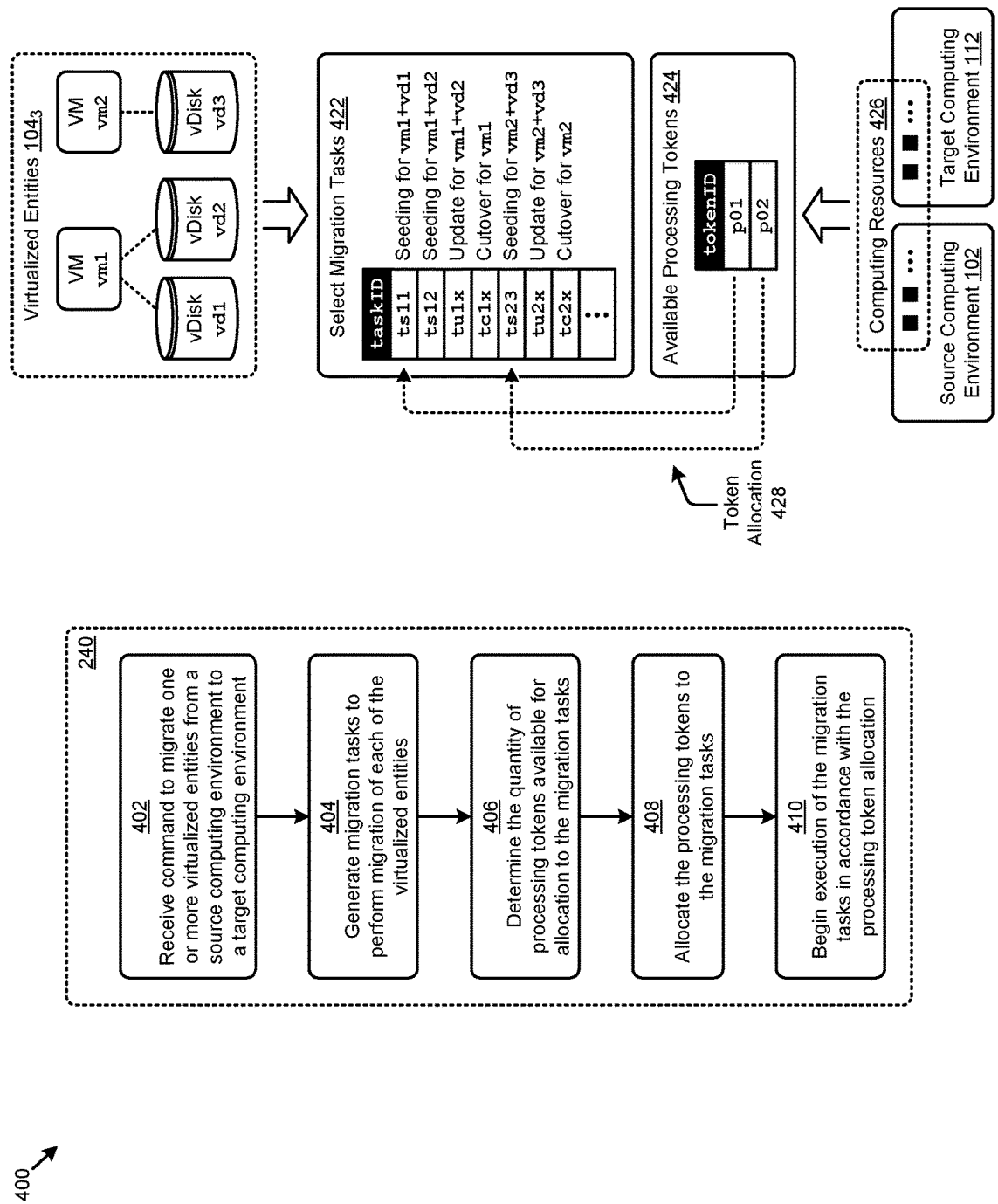
FIG. 4 presents a migration task scheduling technique as implemented by a token-based scheduler that facilitates fine-grained management of in-process migration tasks, according to an embodiment.

FIG. 4 presents a migration task scheduling technique 400 as implemented by a token-based scheduler that facilitates fine-grained management of in-process migration tasks. As an option, one or more variations of migration task scheduling technique 400 or any aspect thereof may be implemented in the context of the architecture and functionality of the embodiments described herein. The migration task scheduling technique 400 or any aspect thereof may be implemented in any environment.

FIG. 4 illustrates aspects pertaining to implementing fine-grained priority management of in-process migration tasks associated with migration of virtualized entities. Specifically, the figure is presented to illustrate one embodiment of certain steps and/or operations of a token-based scheduler that facilitates scheduling and/or invoking a set of migration tasks to perform a migration of virtualized entities from a source computing environment to a target computing environment. A representative scenario is also shown in the figure to illustrate an example application of the migration task scheduling technique 400.

The migration task scheduling technique 400 can commence by receiving a command to migrate one or more virtualized entities from a source computing environment to a target computing environment (step 402). The command might be received, for example, from a user interface controlled by a user (e.g., administrator). For the representative scenario in FIG. 4, a set of virtualized entities $104_3$ comprising two VMs (e.g., VM "vm1" and VM "vm2") and corresponding vDisks (e.g., vDisk "vd1", vDisk "vd2", and vDisk "vd3") are selected for migration.

Migration tasks to perform migration of each of the virtualized entities are generated (step 404). A set of select migration tasks 422 depicts at least seven tasks (e.g., task "ts11", task "ts12", task "tu1x", task "tc1x", task "ts23", task "tu2x", task "tc2x", etc.) that are generated, each being associated with one or more virtualized entity and a particular task type. For example, and as can be observed, a first task type performs "Seeding" of the initial migration data, a second task type will "Update" the migrated data (e.g., ongoing delta updates or a final update before cutover), and a third task type will apply a final delta update to the migrated data just before applying a "Cutover" operation to the virtualized entity (e.g., to prepare for bring up in the context of the target computing environment). As used herein the "Cutover" operation refers to performance of a series of actions taken by or on behalf of a virtualized entity at its source environment so as to advance the virtualized entity toward a condition for bring up in the target environment. In many embodiments, the subject virtualized entity is closed or halted or otherwise brought into quiescence before being brought up in the target environment. As such, during at least a portion of the duration that a virtualized entity is in the process of a cutover operation, and for a duration thereafter, the virtualized entity is not operational.

Such migration tasks might have one or more hierarchical task relationships with one another. As an example, "Seeding" tasks might be parent tasks (e.g., prerequisite tasks) of the "Update" tasks, which are in turn parent tasks (e.g., prerequisite tasks) of the "Cutover" tasks.

A quantity of processing tokens available for allocation to the migration task is determined (step 406). As illustrated, a set of available processing tokens 424 might be determined based at least in part on a set of computing resources 426 available at source computing environment 102 and/or computing resources available at target computing environment 112 and/or computing resources available for communications between the source computing environment and the target computing environment. The available processing tokens 424 indicate that two processing tokens (e.g., identified as processing token "p01" and processing token "p02") are available in the representative scenario of FIG. 4. The processing tokens are then allocated to migration tasks (step 408).

Various techniques can be implemented to perform an initial allocation of processing tokens. For example, as indicated by a token allocation 428, available processing tokens might be allocated to the highest order unprocessed tasks (e.g., "Seeding" tasks) of each virtualized entity. As another example, processing tokens are allocated to requestors in first-come-first-served order. As yet another example, processing tokens are allocated preferentially on the basis of a task's position in a scheduling list, possibly also including scheduling tasks in a round-robin fashion over successive scheduling intervals. A task's position in such a list can change dynamically. Tasks that are prioritized can be moved forward in the list or can be entered at the front of the list. All of the set of tasks in the list receive at least some tokens such that no task in the list is starved for tokens in perpetuity.

When the processing tokens are allocated, execution of migration tasks can begin in accordance with the processing token allocation (step 410). For the shown scenario, migration will commence by invoking execution of task "ts11" and task "ts23". As a task runs, it uses it allotted tokens. When a task has expended its currently-allotted tokens and/or if a task is preempted by a higher priority task, it moves from a "running" state to a "queued" state. The task itself, or a scheduler, or a task-assigned helper routine can cause the state change to be recorded in one or more data structures.

For example, in some cases, the task itself or a task-assigned helper routine can make an entry into a queue, which entry includes a pointer to a particular row or entry of a data structure that indicates the state (e.g., virtual machine migration state, queueing state, etc.) of the task. As such, the migration task manager can detect changes to the in-process migration tasks through use of the aforementioned queueing of state changes, in combination with other techniques that support an order O(1) (e.g., constant time) data storage and retrieval capability. Resulting from the O(1) data storage and retrieval capability, a large number of migration tasks can be re-prioritized in a single re-prioritization cycle without having to perform searches through the data structure in order to act on the changes.

The foregoing discussions include techniques for recording migration task attributes of in-process migration tasks in a data structure (e.g., step 250 of FIG. 2), which techniques are disclosed in further detail as follows.

Figure 5:
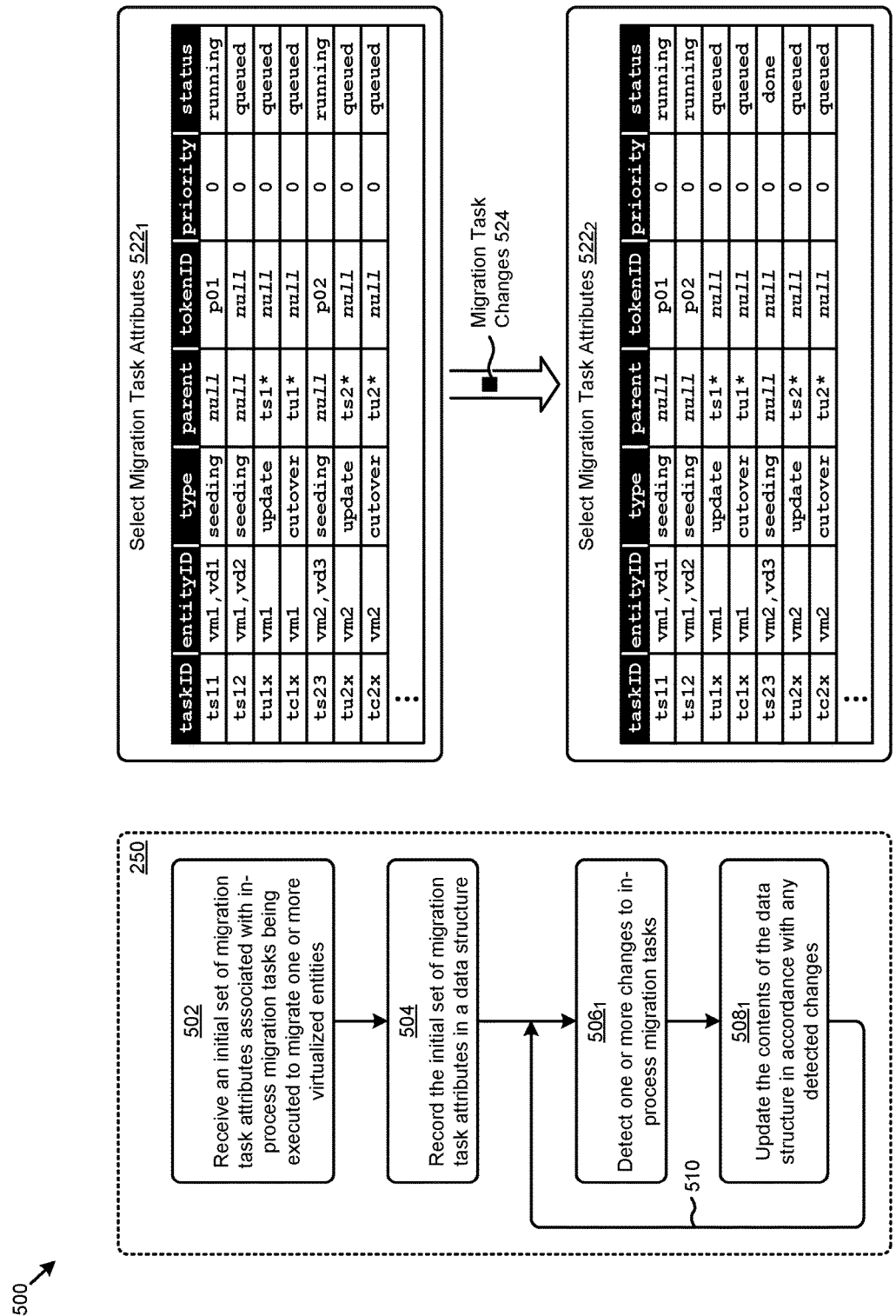
FIG. 5 presents a task attribute recording technique as implemented in systems that facilitate fine-grained management of in-process migration tasks, according to an embodiment.

FIG. 5 presents a task attribute recording technique 500 as implemented in systems that facilitate fine-grained management of in-process migration tasks. As an option, one or more variations of task attribute recording technique 500 or any aspect thereof may be implemented in the context of the architecture and functionality of the embodiments described herein. The task attribute recording technique 500 or any aspect thereof may be implemented in any environment.

FIG. 5 illustrates one aspect pertaining to implementing fine-grained priority management of in-process migration tasks associated with migration of virtualized entities. Specifically, the figure is presented to illustrate one embodiment of certain steps and/or operations that facilitate recording migration task attributes in a data structure implemented specifically to facilitate the herein disclosed techniques. A representative scenario is also shown in the figure to illustrate an example application of the task attribute recording technique 500.

The task attribute recording technique 500 can commence by receiving an initial set of migration task attributes associated with in-process migration tasks that are being executed to migrate one or more virtualized entities (step 502). As an example, the foregoing initial set of migration task attributes might correspond to select migration tasks 422 presented in FIG. 4. The initial set of migration task attributes are recorded in a data structure (step 504). The initial set of migration task attributes as recorded in the data structure are represented as set of select migration task attributes $522_1$. Select migration task attributes $522_1$ describe various aspects of each in-process migration task. For example, select migration task attributes $522_1$ indicate that the priority (e.g., as indicated by "priority=0") is the same for all tasks. Furthermore, task "ts11" and task "ts23" have been allocated the two processing tokens "p01" and "p02", respectively, and as such have a "running" status.

When one or more changes to in-process migration tasks are detected (step $506_1$), the contents (e.g., set of migration task attributes) of the data structure are updated in accordance with detected changes (step $508_1$). Indications of such changes can originate from various sources. For example, a set of migration task changes 524 might include a change originating from a worker process that has indicated that a certain in-process migration task is complete. As another example, migration task changes 524 might include one or more changes associated with a reallocation of processing tokens performed by a token-based scheduler. As shown in an updated set of select migration task attributes $522_2$, migration task changes 524 might result in updates to migration task attributes in the data structure that indicate that task "ts23" is "done" and processing token "p02" is reallocated to task "ts12", which now has a "running" status. The contents (e.g., the set of migration task attributes) of the data structure will continually be updated in response to detected status changes (see path 510).

In some cases, the set of migration task attributes in the data structure are updated (e.g., modified) in response to one or more re-prioritization inputs that are received during the migration process (e.g., step 260 of FIG. 2). Some of such cases are discussed in further detail as follows.

Figure 6:
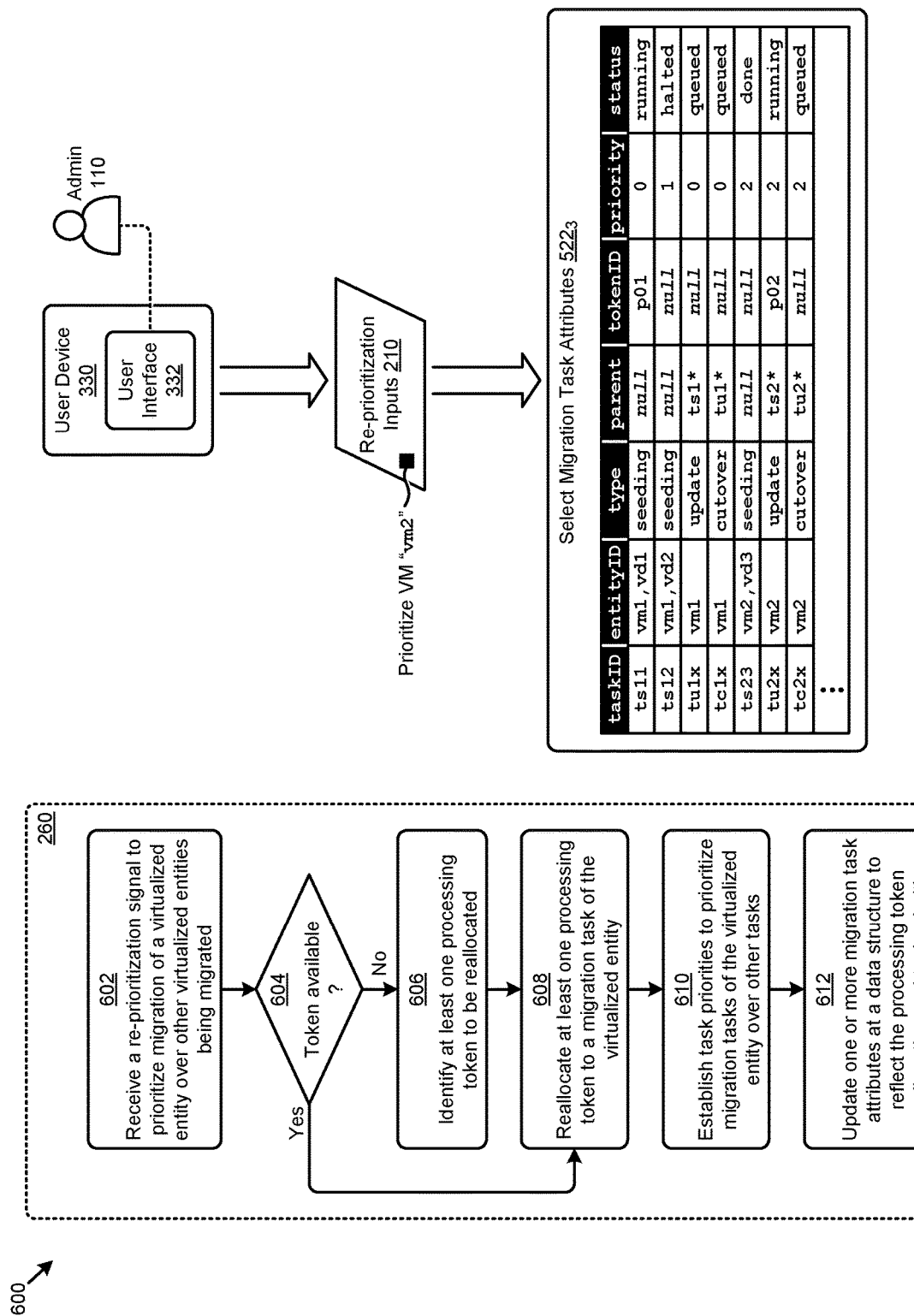
FIG. 6 presents an in-process migration task attribute modification technique as implemented in systems that facilitate fine-grained management of in-process migration tasks, according to an embodiment.

FIG. 6 presents an in-process migration task attribute modification technique 600 as implemented in systems that facilitate fine-grained management of in-process migration tasks. As an option, one or more variations of in-process migration task attribute modification technique 600 or any aspect thereof may be implemented in the context of the architecture and functionality of the embodiments described herein. The in-process migration task attribute modification technique 600 or any aspect thereof may be implemented in any environment.

FIG. 6 illustrates one aspect pertaining to implementing fine-grained priority management of in-process migration tasks associated with migration of virtualized entities. Specifically, the figure is presented to illustrate one embodiment of certain steps and/or operations that facilitate modifying one or more migration task attributes in response to one or more re-prioritization inputs received asynchronously during a migration process. More specifically, the aforementioned re-prioritization inputs received asynchronously during a migration process are asynchronous in the sense that such re-prioritization inputs can be received and processed (e.g., to accelerate migration of an identified workload) at any point during the migration process—even after the migration processed has commenced.

A representative scenario is also shown in the figure to illustrate an example application of the in-process migration task attribute modification technique 600.

The in-process migration task attribute modification technique 600 can commence by receiving a re-prioritization signal to prioritize migration of a virtualized entity over other virtualized entities being migrated (step 602). The foregoing re-prioritization signal might derive from the re-prioritization inputs 210 generated by a user, such as when the user determines that a particular workload is to be preferentially migrated ahead of other workloads being migrated. As shown, such re-prioritization inputs 210 might be generated by an admin 110 at user interface 332. In some embodiments, re-prioritization inputs 210 might be generated by a migration orchestrator process. If no processing tokens are available at the moment in time that the re-prioritization signal is received (see "No" path of decision 604), then at least one processing token is identified for reallocation (step 606). Certain criteria and/or rules might be consulted to identify the processing token.

For example, any in-process migration task that is less than 95 percent complete might be a candidate for releasing the processing token allocated to the task. When a processing token is available at the moment in time that the re-prioritization signal is received (see "Yes" path of decision 604) or when a processing token is identified for reallocation, the processing token is reallocated to a migration task associated with the virtualized entity (step 608). For example, the processing token might be allocated to the highest order unprocessed tasks of the virtualized entity. A set of task priorities are established to prioritize the in-process migration tasks of the virtualized entity over other in-process migration tasks (step 610). Migration task attributes stored in a data structure are then updated to reflect any modification to processing token reallocations, task priorities, and/or other attributes pertaining to in-process migration tasks (step 612).

In the representative scenario shown in FIG. 6, the received re-prioritization inputs 210 indicate that VM "vm2" is to be prioritized over other VMs (e.g., VM "vm1") being migrated. In response to the re-prioritization inputs 210, certain modifications to migration task attributes are recorded in the data structure according to the in-process migration task attribute modification technique 600 and other techniques described herein. More specifically, as compared to select migration task attributes $522_2$ shown in FIG. 5, select migration task attributes $522_3$ of FIG. 6 indicate all in-process migration tasks associated with VM "vm2" have the highest priority (e.g., "priority=2") and processing token "p02" is reallocated to task "tu2x" of VM "vm2" and has a status of "running". Furthermore, the previous owner of processing token "p02" (e.g., task "ts12") is "halted" and prioritized at the second highest priority (e.g., "priority=1") so that task "ts12" will receive the next available processing token.

The foregoing discussions include techniques for completing the migration in accordance with such modified migration task attributes (e.g., step 270 of FIG. 2), which techniques are disclosed in further detail as follows.

Figure 7:
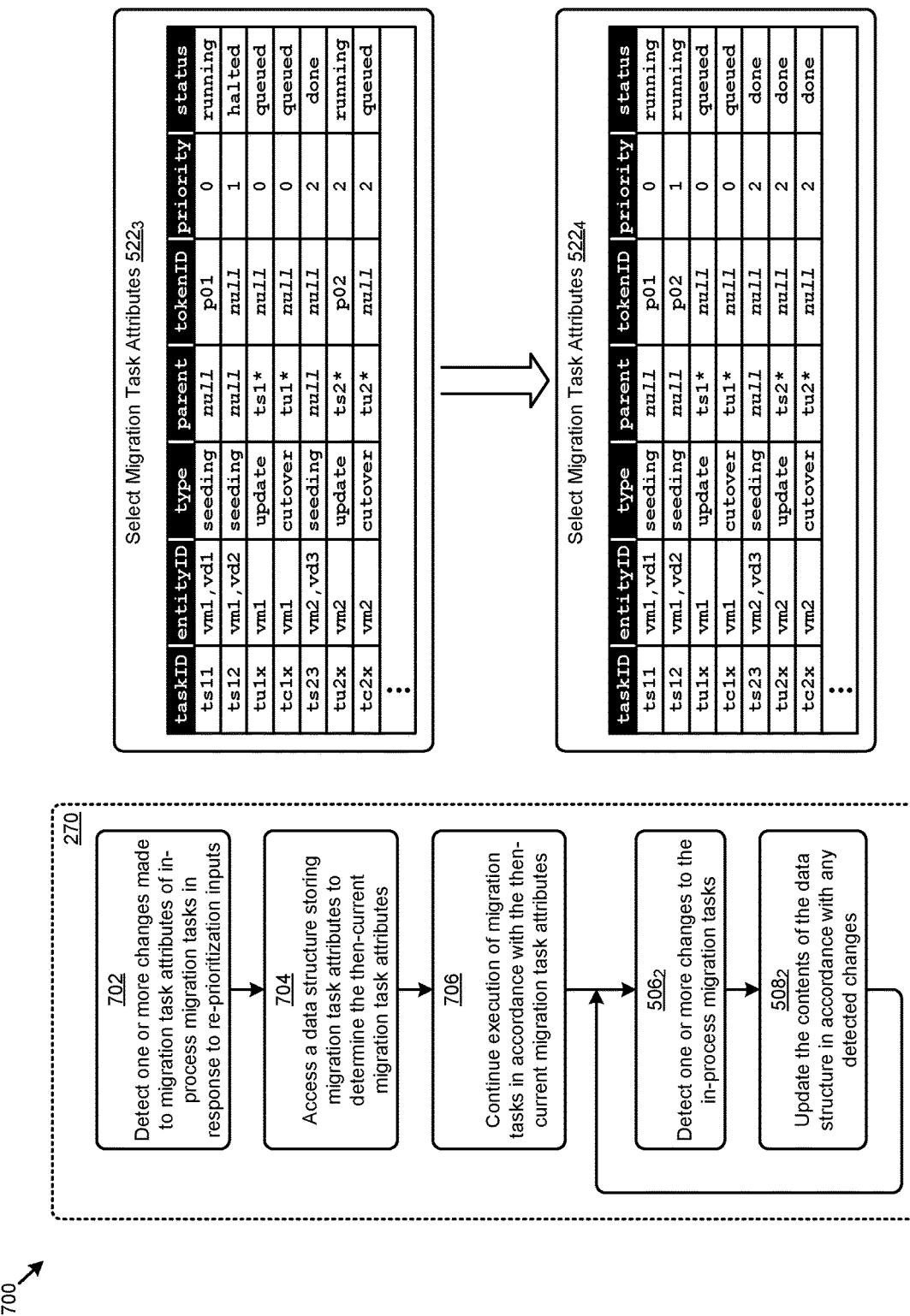
FIG. 7 depicts a migration task execution technique as implemented in systems that facilitate fine-grained management of in-process migration tasks, according to an embodiment.

FIG. 7 depicts a migration task execution technique 700 as implemented in systems that facilitate fine-grained management of in-process migration tasks. As an option, one or more variations of migration task execution technique 700 or any aspect thereof may be implemented in the context of the architecture and functionality of the embodiments described herein. The migration task execution technique 700 or any aspect thereof may be implemented in any environment.

FIG. 7 illustrates one aspect pertaining to implementing fine-grained priority management of in-process migration tasks associated with migration of virtualized entities. Specifically, the figure is presented to illustrate one embodiment of certain steps and/or operations that facilitate completing execution of in-process migration tasks in accordance with migration task attributes that have been modified in response to receiving one or more re-prioritization inputs. A representative scenario is also shown in the figure to illustrate an example application of the migration task execution technique 700.

The migration task execution technique 700 can commence by detecting one or more changes (e.g., modifications) to migration task attributes of certain in-process migration tasks that were performed in response to one or more in-process re-prioritization inputs (step 702). As an example, select migration task attributes $522_3$ shown in the figure comprise certain attributes that were modified in response to processing of re-prioritization inputs, such as are discussed pertaining to FIG. 6.

A data structure storing migration task attributes is accessed to determine the then-current migration task attributes (step 704). In the example scenario of FIG. 7, the select migration task attributes $522_3$ represent the then-current migration task attributes. Execution of the in-process migration task continues in accordance with the then-current migration task attributes (step 706). For example, select migration task attributes $522_3$ indicate that task "ts11" and task "tu2x" will be executed until completion.

Barring receipt of any other re-prioritization inputs, execution of in-process migration tasks and associated updating of migration task attributes in the data structure will be performed as earlier discussed pertaining to FIG. 5. Specifically, as one or more changes to in-process migration tasks are detected during execution of the tasks (step $506_2$), the contents (e.g., set of migration task attributes) of the data structure are updated in accordance with detected changes (step $508_2$). As shown in a set of select migration task attributes $522_4$, for example, processing token "p02" is reallocated to task "ts12" following completion of all migration tasks (e.g., task "ts23", task "tu2x", and task "tc2x") associated with VM "vm2". The foregoing steps (step $506_2$ and step $508_2$) are performed until migration of all the virtualized entities is complete.

Additional Embodiments of the Disclosure

Additional Practical Application Examples

Figure 8:
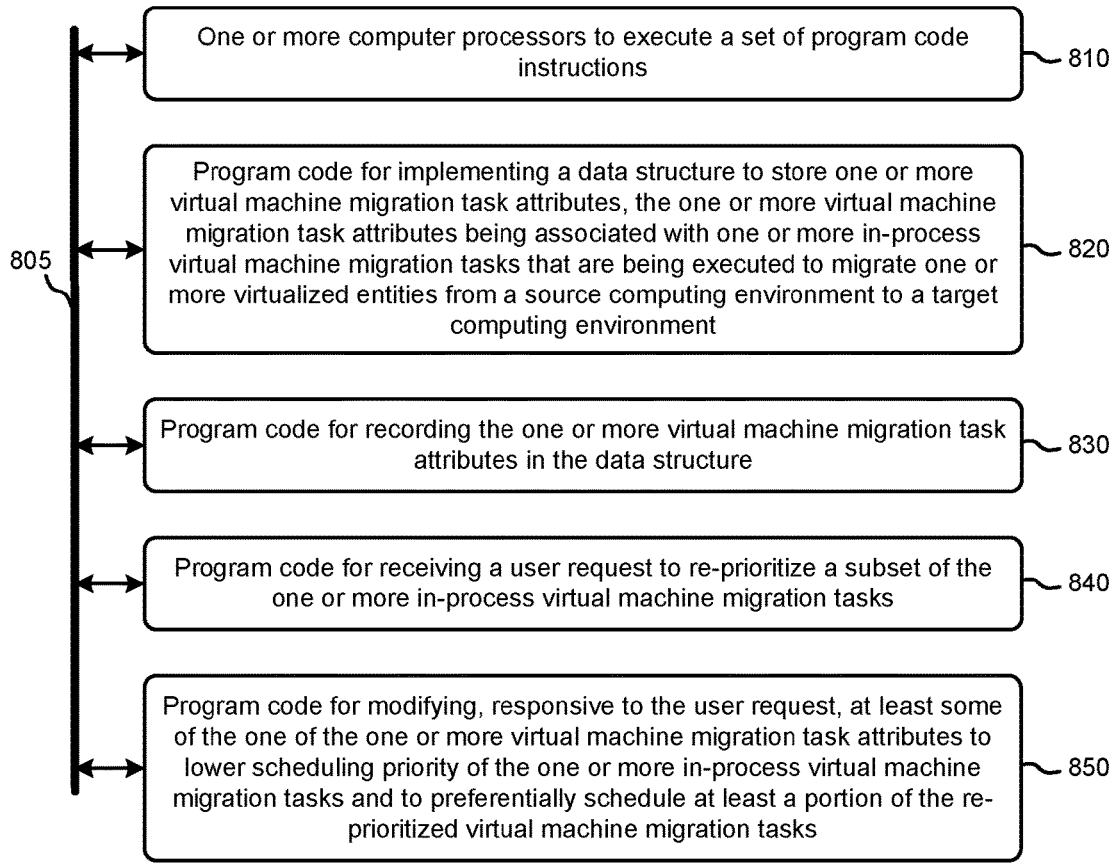
FIG. 8 depicts system components as arrangements of computing modules that are interconnected so as to implement certain of the herein-disclosed embodiments.

FIG. 8 depicts a system 800 as an arrangement of computing modules that are interconnected so as to operate cooperatively to implement certain of the herein-disclosed embodiments. This and other embodiments present particular arrangements of elements that, individually or as combined, serve to form improved technological processes that address achieving accelerated VM migration in the presence of many in-process VM migrations that are contending for a finite amount of computing resources. The partitioning of system 800 is merely illustrative and other partitions are possible. As an option, the system 800 may be implemented in the context of the architecture and functionality of the embodiments described herein. Of course, however, the system 800 or any operation therein may be carried out in any desired environment.

The system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with any other operations over communication path 805. The modules of the system can, individually or in combination, perform method operations within system 800. Any operations performed within system 800 may be performed in any order unless as may be specified in the claims.

The shown embodiment implements a portion of a computer system, presented as system 800, comprising one or more computer processors to execute a set of program code instructions (module 810) and modules for accessing memory to hold program code instructions to perform: implementing a data structure to store one or more virtual machine migration task attributes, the one or more virtual machine migration task attributes being associated with one or more in-process virtual machine migration tasks that are being executed to migrate one or more virtualized entities from a source computing environment to a target computing environment (module 820); recording the one or more virtual machine migration task attributes in the data structure (module 830); receiving a re-prioritization signal to re-prioritize a subset of the one or more in-process virtual machine migration tasks (module 840); and modifying, responsive to the re-prioritization signal, at least some of the one of the one or more virtual machine migration task attributes to lower scheduling priority of the one or more in-process virtual machine migration tasks and to preferentially schedule at least a portion of the re-prioritized virtual machine migration tasks (module 850).

Variations of the foregoing may include more or fewer of the shown modules. Certain variations may perform more or fewer (or different) steps and/or certain variations may use data elements in more or in fewer (or different) operations. Still further, some embodiments include variations in the operations performed, and some embodiments include variations of aspects of the data elements used in the operations.

System Architecture Overview

Additional System Architecture Examples

Figure 9A:
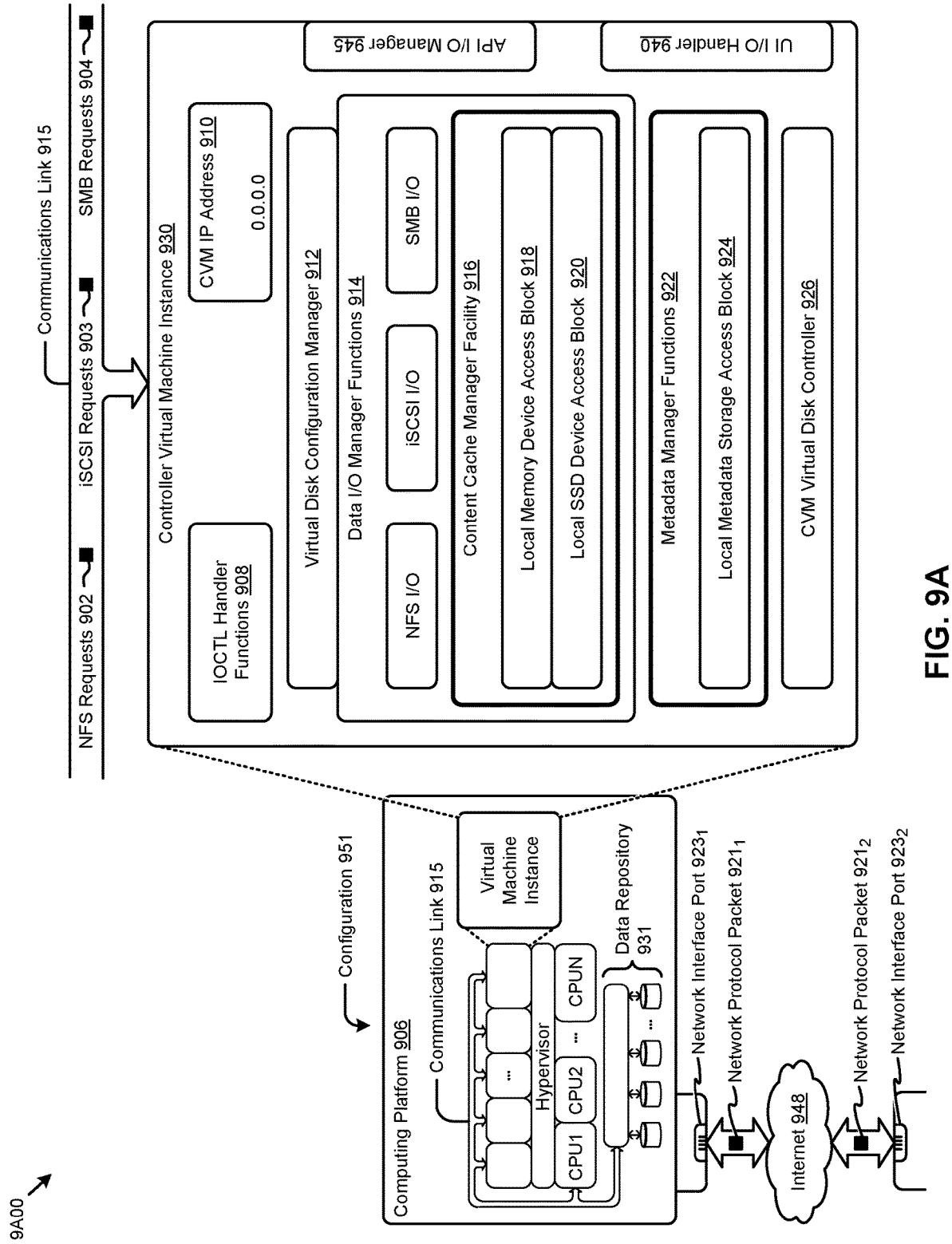
FIG. 9A, FIG. 9B, and FIG. 9C depict virtualized controller architectures comprising collections of interconnected components suitable for implementing embodiments of the present disclosure and/or for use in the herein-described environments.

FIG. 9A depicts a virtualized controller as implemented by the shown virtual machine architecture 9A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 9A00 comprises a collection of interconnected components suitable for implementing embodiments of the present disclosure and/or for use in the herein-described environments. Moreover, virtual machine architecture 9A00 includes a virtual machine instance in configuration 951 that is further described as pertaining to controller virtual machine instance 930. Configuration 951 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 930.

In this and other configurations, a controller virtual machine instance receives block I/O (input/output or IO) storage requests as network file system (NFS) requests in the form of NFS requests 902, and/or internet small computer storage interface (iSCSI) block IO requests in the form of iSCSI requests 903, and/or Samba file system (SMB) requests in the form of SMB requests 904. The controller virtual machine (CVM) instance publishes and responds to an internet protocol (IP) address (e.g., CVM IP address 910). Various forms of input and output (I/O or IO) can be handled by one or more IO control handler functions (e.g., IOCTL handler functions 908) that interface to other functions such as data IO manager functions 914 and/or metadata manager functions 922. As shown, the data IO manager functions can include communication with virtual disk configuration manager 912 and/or can include direct or indirect communication with any of various block IO functions (e.g., NFS IO, iSCSI IO, SMB IO, etc.).

In addition to block IO functions, configuration 951 supports IO of any form (e.g., block IO, streaming IO, packet-based IO, HTTP traffic, etc.) through either or both of a user interface (UI) handler such as UI IO handler 940 and/or through any of a range of application programming interfaces (APIs), possibly through API IO manager 945.

Communications link 915 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 930 includes content cache manager facility 916 that accesses storage locations, possibly including local dynamic random access memory (DRAM) (e.g., through local memory device access block 918) and/or possibly including accesses to local solid state storage (e.g., through local SSD device access block 920).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 931, which in turn can be formatted into any one or more storage areas, and which can comprise parameterized storage accessible by a key (e.g., a filename, a table name, a block address, an offset address, etc.). Data repository 931 can store any forms of data and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 924. The data repository 931 can be configured using CVM virtual disk controller 926, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 951 can be coupled by communications link 915 (e.g., backplane, LAN, PSTN, wired or wireless network, etc.) and each instance may perform respective portions of sequences of instructions as may be required to practice embodiments of the disclosure.

The shown computing platform 906 is interconnected to the Internet 948 through one or more network interface ports (e.g., network interface port $923_1$ and network interface port $923_2$). Configuration 951 can be addressed through one or more network interface ports using an IP address. Any operational element within computing platform 906 can perform sending and receiving operations using any of a range of network protocols, possibly including network protocols that send and receive packets (e.g., network protocol packet $921_1$ and network protocol packet $921_2$).

Computing platform 906 may transmit and receive messages that can be composed of configuration data and/or any other forms of data and/or instructions organized into a data structure (e.g., communications packets). In some cases, the data structure includes program code instructions (e.g., application code) communicated through the Internet 948 and/or through any one or more instances of communications link 915. Received program code may be processed and/or executed by a CPU as it is received and/or program code may be stored in any volatile or non-volatile storage for later execution. Program code can be transmitted via an upload (e.g., an upload from an access device over the Internet 948 to computing platform 906). Further, program code and/or the results of executing program code can be delivered to a particular user via a download (e.g., a download from computing platform 906 over the Internet 948 to an access device).

Configuration 951 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to fine-grained management of in-process migration tasks. In some embodiments, a module may include one or more state machines and/or combinational logic used to implement or facilitate the operational and/or performance characteristics pertaining to fine-grained management of in-process migration tasks.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of fine-grained management of in-process migration tasks). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to fine-grained management of in-process migration tasks, and/or for improving the way data is manipulated when performing computerized operations pertaining to implementing fine-grained priority management of in-process migration tasks associated with migration of virtualized entities.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 9B:
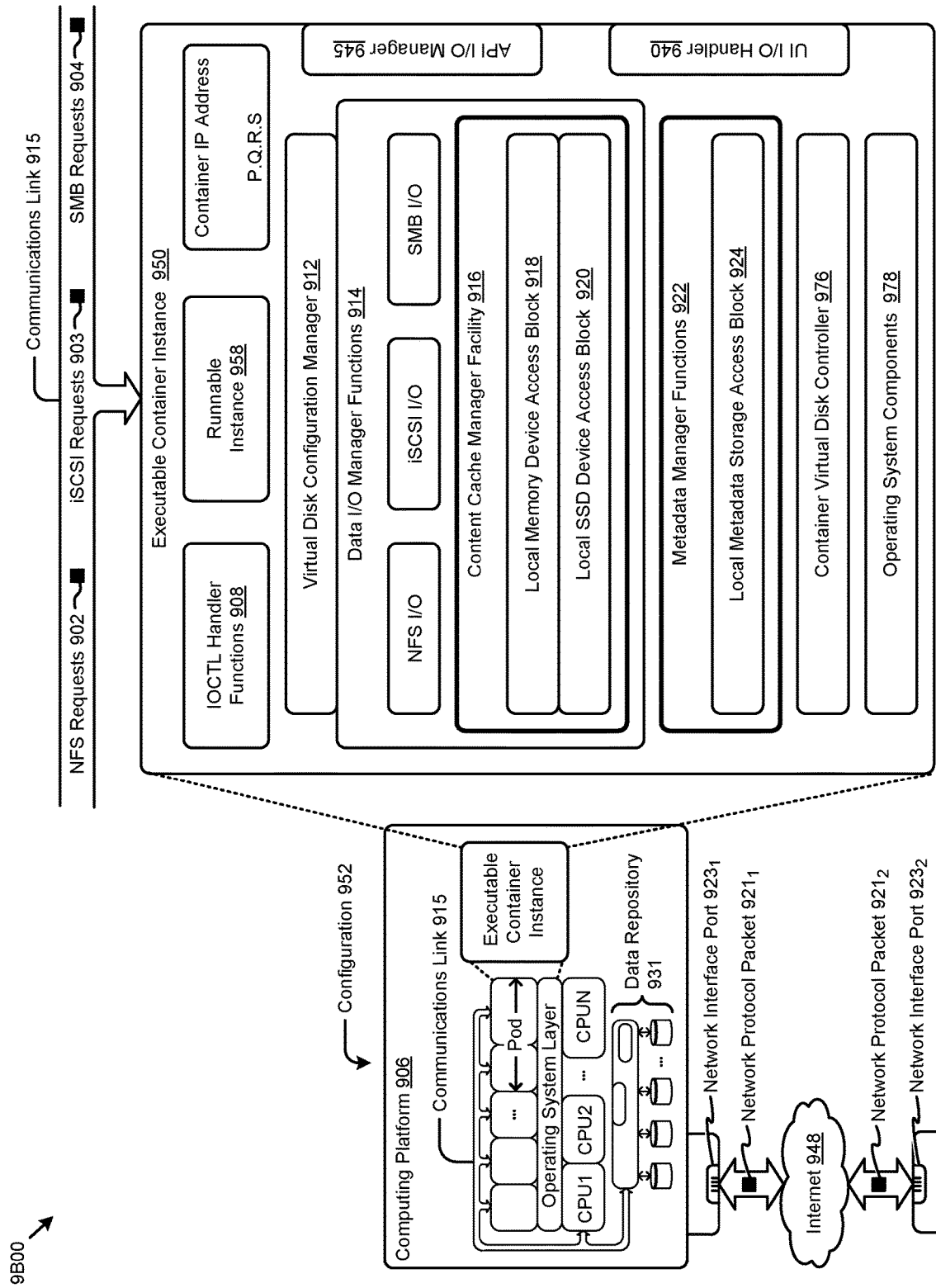

FIG. 9B depicts a virtualized controller implemented by containerized architecture 9B00. The containerized architecture comprises a collection of interconnected components suitable for implementing embodiments of the present disclosure and/or for use in the herein-described environments. Moreover, the shown containerized architecture 9B00 includes an executable container instance in configuration 952 that is further described as pertaining to executable container instance 950. Configuration 952 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 950). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system and can be configured to be accessed by file system commands (e.g., "ls" or "ls-a", etc.). The executable container might optionally include operating system components 978, however such a separate set of operating system components need not be provided. As an alternative, an executable container can include runnable instance 958, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 976. Such a container virtual disk controller can perform any of the functions that the aforementioned CVM virtual disk controller 926 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 9C:
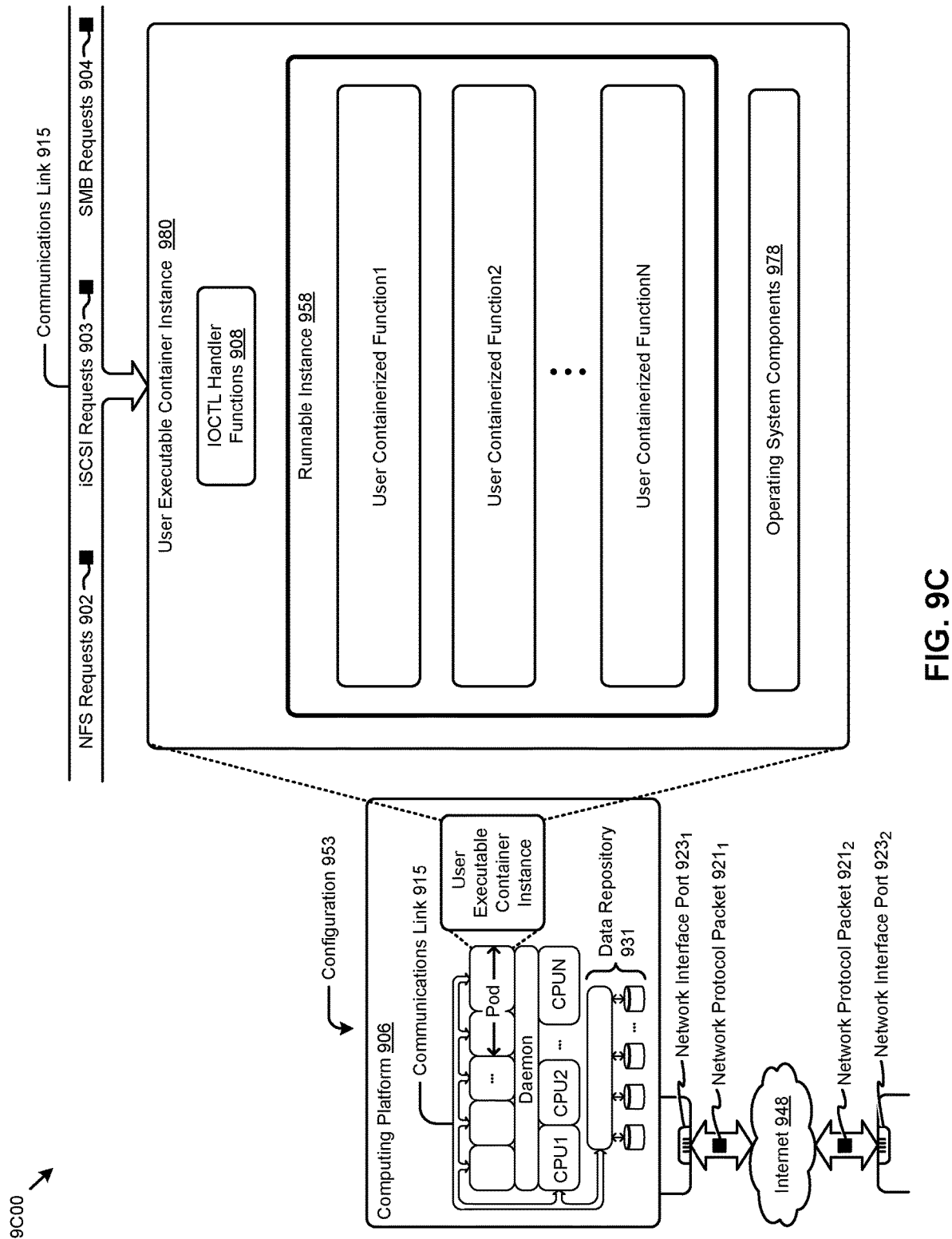

FIG. 9C depicts a virtualized controller implemented by a daemon-assisted containerized architecture 9C00. The containerized architecture comprises a collection of interconnected components suitable for implementing embodiments of the present disclosure and/or for use in the herein-described environments. Moreover, the shown daemon-assisted containerized architecture includes a user executable container instance in configuration 953 that is further described as pertaining to user executable container instance 980. Configuration 953 includes a daemon layer (as shown) that performs certain functions of an operating system.

User executable container instance 980 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 958). In some cases, the shown operating system components 978 comprise portions of an operating system, which portions are interfaced with or included in the runnable instance and/or any user containerized functions. In this embodiment of a daemon-assisted containerized architecture, the computing platform 906 might or might not host operating system components other than operating system components 978. More specifically, the shown daemon might or might not host operating system components other than operating system components 978 of user executable container instance 980.

The virtual machine architecture 9A00 of FIG. 9A and/or the containerized architecture 9B00 of FIG. 9B and/or the daemon-assisted containerized architecture 9C00 of FIG. 9C can be used in any combination to implement a distributed platform that contains multiple servers and/or nodes that manage multiple tiers of storage where the tiers of storage might be formed using the shown data repository 931 and/or any forms of network accessible storage. As such, the multiple tiers of storage may include storage that is accessible over communications link 915. Such network accessible storage may include cloud storage or networked storage (e.g., a SAN or "storage area network"). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices, such as SSDs or RAPMs, or hybrid HDDs or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term vDisk refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 951 of FIG. 9A) to manage the interactions between the underlying hardware and user virtual machines or containers that run client software.

Distinct from user virtual machines or user executable containers, a special controller virtual machine (e.g., as depicted by controller virtual machine instance 930) or as a special controller executable container is used to manage certain storage and I/O activities. Such a special controller virtual machine is referred to as a "CVM", or as a controller executable container, or as a service virtual machine "SVM", or as a service executable container, or as a "storage controller". In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for virtual machine migration task management, the method performed by a computer and comprising:
receiving a command to migrate a first virtualized entity from a source computing environment to a target computing environment, wherein a second virtualized entity is to be migrated from the source computing environment to the target computing environment;
generating a plurality of sets of virtual machine migration tasks,
wherein the plurality of sets of virtual machine migration tasks include:
first virtual machine migration tasks to perform migration of the first virtualized entity, and
second virtual machine migration tasks generated to perform migration of the second virtualized entity;
allocating a token to a virtual machine migration task of the first virtual machine migration tasks based on a relative priority assigned to the virtual machine migration task for the first virtualized entity and in accordance with a virtual machine migration state,
wherein the relative priority assigned to the virtual machine migration task of the first virtualized entity is different from a second relative priority assigned to a second virtual machine migration task of the second virtualized entity, and
wherein availability of the token for allocation is based at least in part on identifying an available computing resource and the token is allocated to the first virtual machine migration task in accordance with a corresponding scheduling priority assignment and the availability of the token; and
invoking execution of the first virtual machine migration task using a token-based scheduler and the allocated token.

2. The method of claim 1, wherein the token corresponds to at least one of, a CPU resource token, a networking resource token, or a storage resource token, and a quantity of the token is determined based at least in part on availability of a computing resource.

3. The method of claim 1, wherein the first virtualized entity comprises at least one of, a virtual disk, or a virtual NIC.

4. The method of claim 1, further comprising receiving a re-prioritization signal.

5. The method of claim 4, wherein the re-prioritization signal derives from a user interface.

6. The method of claim 1, further comprising:
implementing a data structure to store a virtual machine migration task attribute, the virtual machine migration task attribute being associated with execution of the virtual machine migration task;
detecting a status change to the virtual machine migration task; and
updating the virtual machine migration task attribute recorded in the data structure, the virtual machine migration task attribute being updated based at least in part on the status change.

7. The method of claim 6, wherein the virtual machine migration task attribute corresponds to at least one of, a priority level, a token allocation, or status indicator.

8. The method of claim 1, wherein the source computing environment comprises a first hypervisor type and the target computing environment comprises a second hypervisor type.

9. A non-transitory computer readable medium having stored thereon a set of instructions which, when stored in memory and executed by a processor causes a set of acts for virtual machine migration task management, the set of acts comprising:
receiving a command to migrate a first virtualized entity from a source computing environment to a target computing environment, wherein a second virtualized entity is to be migrated from the source computing environment to the target computing environment;
generating a plurality of sets of virtual machine migration tasks,
wherein the plurality of sets of virtual machine migration tasks include:
first virtual machine migration tasks to perform migration of the first virtualized entity, and
second virtual machine migration tasks to perform migration of the second virtualized entity;
allocating a token to a virtual machine migration task of the first virtual machine migration tasks based on a relative priority assigned to the virtual machine migration task for the first virtualized entity and in accordance with a virtual machine migration state,
wherein the relative priority assigned to the virtual machine migration task of the first virtualized entity is different from a second relative priority assigned to a second virtual machine migration task of the second virtualized entity, and
wherein availability of the token for allocation is based at least in part on identifying an available computing resource and the token is allocated to the first virtual machine migration task in accordance with a corresponding scheduling priority assignment and the availability of the token; and
invoking execution of the first virtual machine migration task using a token-based scheduler and the allocated token.

10. The computer readable medium of claim 9, wherein the token corresponds to at least one of, a CPU resource token, a networking resource token, or a storage resource token, and a quantity of the token is determined based at least in part on availability of a computing resource.

11. The computer readable medium of claim 9, wherein the first virtualized entity comprises at least one of, a virtual disk, or a virtual NIC.

12. The computer readable medium of claim 9, further comprising instructions which, when stored in memory and executed by the processor causes the processor to perform acts of receiving a re-prioritization signal.

13. The computer readable medium of claim 12, wherein the re-prioritization signal derives from a user interface.

14. The computer readable medium of claim 9, further comprising instructions which, when stored in memory and executed by processor causes the processor to perform acts of:
implementing a data structure to store a virtual machine migration task attribute, the virtual machine migration task attribute being associated with execution of the virtual machine migration task;
detecting a status change to the virtual machine migration task; and
updating the virtual machine migration task attribute recorded in the data structure, the virtual machine migration task attribute being updated based at least in part on the status change.

15. The computer readable medium of claim 14, wherein the virtual machine migration task attribute corresponds to at least one of, a priority level, a token allocation, or status indicator.

16. The computer readable medium of claim 9, wherein the source computing environment comprises a first hypervisor type and the target computing environment comprises a second hypervisor type.

17. A system for virtual machine migration task management, comprising:
a storage medium having stored thereon a set of instructions; and
a processor that executes the set of instructions to cause a set of acts, the set of acts comprising,
receiving a command to migrate a first virtualized entity from a source computing environment to a target computing environment, wherein a second virtualized entity is to be migrated from the source computing environment to the target computing environment;
generating a plurality of sets of virtual machine migration tasks,
wherein the plurality of sets of virtual machine migration tasks include:
first virtual machine migration tasks to perform migration of the first virtualized entity,
second virtual machine migration tasks generated to perform migration of the second virtualized entity;
allocating a token to a virtual machine migration task of the first virtual machine migration tasks based on a relative priority assigned to the virtual machine migration task for the first virtualized entity and in accordance with a virtual machine migration state,
wherein the relative priority assigned to the virtual machine migration task of the first virtualized entity is different from a second relative priority assigned to a second virtual machine migration task of the second virtualized entity, and
wherein availability of the token for allocation is based at least in part on identifying an available computing resource and the token is allocated to the first virtual machine migration task in accordance with a corresponding scheduling priority assignment and the availability of the token; and
invoking execution of the first virtual machine migration task using a token-based scheduler and the allocated token.

18. The system of claim 17, wherein the token corresponds to at least one of, a CPU resource token, a networking resource token, or a storage resource token, and a quantity of the token is determined based at least in part on availability of a computing resource.

19. The system of claim 17, wherein the first virtualized entity comprises at least one of, a virtual disk, or a virtual NIC.

20. The system of claim 17, wherein the set of acts further comprise:
implementing a data structure to store a virtual machine migration task attribute, the virtual machine migration task attribute being associated with execution of the virtual machine migration task;
detecting a status change to the virtual machine migration task; and
updating the virtual machine migration task attribute recorded in the data structure, the virtual machine migration task attribute being updated based at least in part on the status change.

21. The system of claim 20, wherein the virtual machine migration task attribute corresponds to at least one of, a priority level, a token allocation, or status indicator.

22. The system of claim 17, wherein the set of acts further comprise receiving a re-prioritization signal.

23. The system of claim 22, wherein the re-prioritization signal derives from a user interface.

24. The system of claim 17, wherein the source computing environment comprises a first hypervisor type and the target computing environment comprises a second hypervisor type.

* * * * *